(12) United States Patent
Chen et al.

(10) Patent No.: US 11,837,892 B2
(45) Date of Patent: Dec. 5, 2023

(54) CHARGING CONTROL APPARATUSES, DEVICES TO BE CHARGED, AND CHARGING CONTROL METHODS

(71) Applicant: GUANGDONG OPPO MOBILE TELECOMMUNICATIONS CORP., LTD., Guangdong (CN)

(72) Inventors: Shebiao Chen, Guangdong (CN); Chen Tian, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 770 days.

(21) Appl. No.: 16/968,031

(22) PCT Filed: Oct. 30, 2018

(86) PCT No.: PCT/CN2018/112765
§ 371 (c)(1),
(2) Date: Aug. 6, 2020

(87) PCT Pub. No.: WO2020/087290
PCT Pub. Date: May 7, 2020

(65) Prior Publication Data
US 2021/0376618 A1  Dec. 2, 2021

(51) Int. Cl.
*H01M 10/44* (2006.01)
*H01M 10/46* (2006.01)
(Continued)

(52) U.S. Cl.
CPC ...... *H02J 7/0019* (2013.01); *H02J 7/007182* (2020.01); *H02M 3/005* (2013.01); *H02M 3/1582* (2013.01); *H02J 2207/20* (2020.01)

(58) Field of Classification Search
CPC .... H02J 7/0019; H02J 7/0014; H02J 7/00036; H02J 7/007182; H02J 2207/20;
(Continued)

(56) References Cited

U.S. PATENT DOCUMENTS

2011/0316520 A1   12/2011   Kawahara et al.
2015/0214762 A1    7/2015   Hung et al.
2018/0248385 A1*   8/2018   Zhang ................. H02M 3/01

FOREIGN PATENT DOCUMENTS

CN     102185354 A     9/2011
CN     102769327 A    11/2012
(Continued)

OTHER PUBLICATIONS

Indian Examination Report for IN Application 202017050692 dated Jun. 11, 2021. (6 pages).
(Continued)

*Primary Examiner* — Edward Tso
(74) *Attorney, Agent, or Firm* — Young Basile Hanlon & MacFarlane, P.C.

(57) ABSTRACT

A charging control apparatus, a device to be charged, and a charging control method are provided. The charging control apparatus includes: a first charging channel configured to charge a plurality of cells coupled in series according to a charging signal provided by a first-type power supply device; a second charging channel configured to charge a part of the cells in the plurality of cells according to a charging signal provided by a second-type power supply device; and an equalizing circuit configured to equalize a voltage of the plurality of cells during an operating process of the second charging channel.

19 Claims, 11 Drawing Sheets

(51) Int. Cl.
　　　*H02J 7/00*　　　　(2006.01)
　　　*H02M 3/00*　　　(2006.01)
　　　*H02M 3/158*　　(2006.01)

(58) Field of Classification Search
　　　CPC ....... H01M 10/425; H01M 2010/4271; H01M
　　　　　　2010/4278; H01M 10/4207; H02M 3/005;
　　　　　　　　　　　　　　　　　　　　H02M 3/1582
　　　USPC .................. 320/107, 116, 117, 118, 119, 122
　　　See application file for complete search history.

(56) References Cited

FOREIGN PATENT DOCUMENTS

| | | |
|---|---|---|
| CN | 104868532 A | 8/2015 |
| CN | 106058956 A | 10/2016 |
| CN | 108124498 A | 6/2018 |
| CN | 108233460 A | 6/2018 |
| TW | 200822418 A | 5/2008 |
| WO | 2008090453 A2 | 7/2008 |

OTHER PUBLICATIONS

Extended European Search Report for EP Application 18938905.9 dated Jul. 2, 2021. (7 pages).
Chinese Office Action with English Translation for CN Application 201880052198.4 dated Feb. 17, 2023. (24 pages).
English translation of ISR for PCT application PCTCN 2018112765 mailed May 8, 2019.
Chinese Office Action with English Translation for CN Application 201880052198.4 dated May 24, 2023. (27 pages).

* cited by examiner

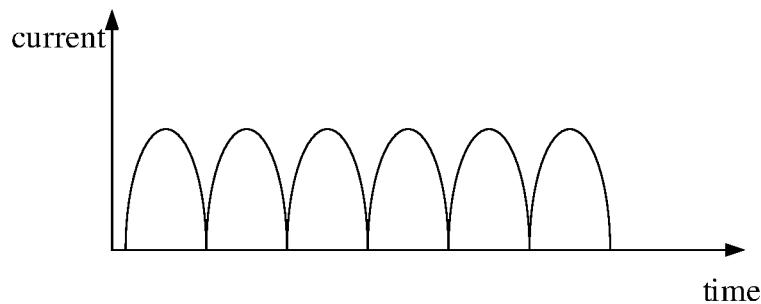
FIG. 18
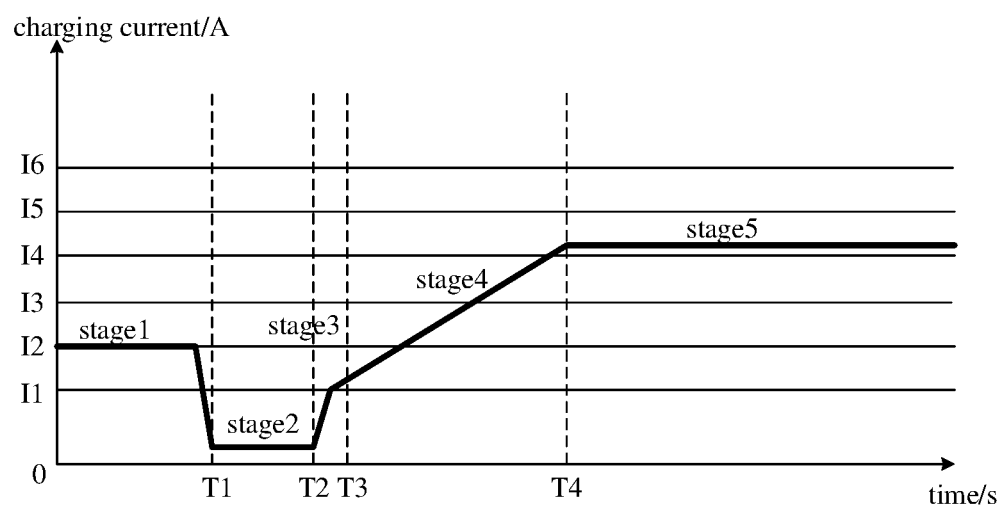
FIG. 19
controlling the second charging channel to operate and the equalizing circuit to operate when it is detected that the second-type power supply device is coupled to the charging control apparatus ⎯2010
FIG. 20

CHARGING CONTROL APPARATUSES, DEVICES TO BE CHARGED, AND CHARGING CONTROL METHODS

CROSS-REFERENCE TO RELATED APPLICATION(S)

This application is a 371 application of International Application No. PCT/CN2018/112765, filed on Oct. 30, 2018, the entire disclosure of which is hereby incorporated by reference.

TECHNICAL FIELD

The present disclosure relates to a field of charging technologies, and more particularly, to a charging control apparatus, a device to be charged, and a charging control method.

BACKGROUND

At present, a device to be charged (such as a smart phone) is favored increasingly by consumers, but the device to be charged has a large power consumption and needs to be charged frequently.

The device to be charged is usually charged by a power supply device (e.g., an adapter). The device to be charged is charged generally by the adapter matching with the device to be charged. When the device to be charged is coupled with other adapters not matched, the device to be charged may not be compatible with the other adapters for charging.

SUMMARY

The charging control apparatus is provided according to a first aspect of the present disclosure. The charging control apparatus includes a first charging channel, a second charging channel, and an equalizing circuit. The first charging channel is configured to charge a plurality of cells coupled in series according to a charging signal provided by a first-type power supply device. The second charging channel is configured to charge a part of the plurality of cells according to a charging signal provided by a second-type power supply device. The equalizing circuit is configured to equalize voltages of the plurality of cells during an operating process of the second charging channel.

The device to be charged is provided according to a second aspect of the present disclosure. The device includes: a battery, including a plurality of cells coupled with each other in series; and the charging control apparatus of the first aspect.

The charging control method is provided according to a third aspect of the present disclosure. The method is applied to the charging control apparatus. The charging control apparatus includes a first charging channel, a second charging channel, and an equalizing circuit. The first charging channel is configured to charge a plurality of cells coupled in series according to a charging signal provided by a first-type power supply device. The second charging channel is configured to charge a part of the plurality of cells according to a charging signal provided by a second-type power supply device. The equalizing circuit is configured to equalize voltages of the plurality of cells during an operating process of the second charging channel. The charging control method includes: controlling the second charging channel to operate and controlling the equalizing circuit to operate when it is detected that the second-type power supply device is coupled to the charging control apparatus.

BRIEF DESCRIPTION OF DRAWINGS

FIG. 18 is a waveform diagram of pulsating direct current according to an embodiment of the present disclosure.

FIG. 19 is a flow chart of a fast charging process according to an embodiment of the present disclosure.

FIG. 20 is a flow chart of a charging control method according to an embodiment of the present disclosure.

DETAILED DESCRIPTION

Figure 1:
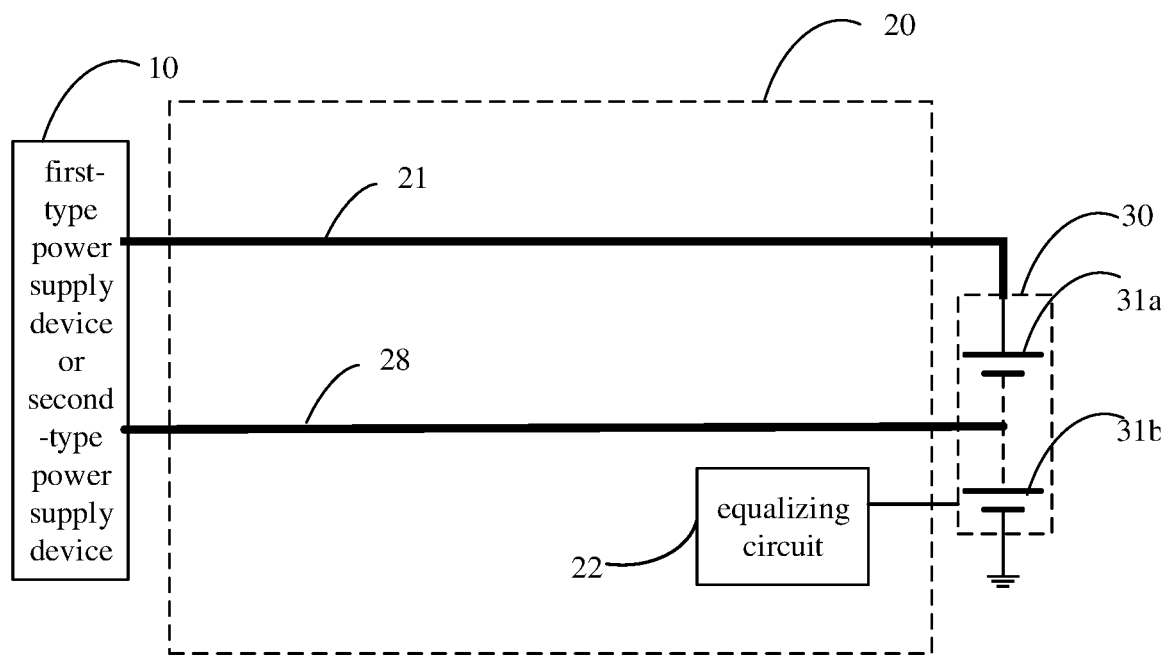
FIG. 1 is a schematic block diagram of a charging system according to an embodiment of the present disclosure.

A power supply device for charging a device to be charged is mentioned in the related art. The power supply device may operate in a constant voltage mode. Voltage output by the power supply device remains basically constant, such as 5V, 9V, 12V, 20V, or the like, in the constant voltage mode.

The voltage output by the power supply device is not suitable for being directly applied to two ends of a battery, but needs to be converted by a conversion circuit in the device to be charged so as to acquire a charging voltage and/or charging current expected by the battery in the device to be charged.

The conversion circuit is configured to convert the voltage output by the power supply device so as to meet a requirement of the charging voltage and/or charging current expected by the battery.

As an example, the conversion circuit may refer to a charging management module, such as a charging integrated circuit (IC). The conversion circuit is configured to manage the charging voltage and/or charging current of the battery during a charging process of the battery. The conversion circuit has a function of a voltage feedback module and/or a function of a current feedback module so as to manage of the charging voltage and/or charging current of the battery.

For example, the charging process of the battery may include one or more of a trickle charging stage, a constant-current charging stage, and a constant-voltage charging stage. During the trickle charging stage, the conversion circuit may utilize a current feedback loop such that current flowing into the battery during the trickle charging stage meets a charging current (e.g., a first charging current) expected by the battery. During the constant-current charging stage, the conversion circuit may utilize the current feedback loop such current flowing into the battery during the constant-current charging stage meets a charging current (e.g., a second charging current, which may be greater than the first charging current) expected by the battery. During the constant-voltage charging stage, the conversion circuit may utilize a voltage feedback loop such that voltage applied to two ends of the battery during the constant-voltage charging stage meets a charging voltage expected by the battery.

As an example, the conversion circuit may be configured to, when the voltage output by the power supply device is greater than the charging voltage expected by the battery, perform a buck conversion on the voltage output by the power supply device, so that the buck-converted charging voltage meets the requirement of the charging voltage expected by the battery. As another example, the conversion circuit may be configured to, when the voltage output by the power supply device is smaller than the charging voltage expected by the battery, perform a boost conversion on the voltage output by the power supply device, so that the boost-converted charging voltage meets the requirement of the charging voltage expected by the battery.

As another example, taking the power supply device outputting a constant voltage of 5V as an example, when the battery includes a single cell (taking a lithium cell as an example, a charging cut-off voltage of the single cell is 4.2V), the conversion circuit (e.g., a Buck circuit) may perform the buck conversion on the voltage output by the power supply device, so that the charging voltage obtained after the buck conversion meets a requirement of the charging voltage expected by the battery.

As another example, taking the power supply device outputting a constant voltage of 5V as an example, when the power supply device charges a battery having two or more cells coupled in series (taking a lithium cell as an example, a charging cut-off voltage of the single cell is 4.2V), the conversion circuit (for example, a Boost circuit) may perform a boost conversion on the voltage output by the power supply device, so that the charging voltage obtained after the boost conversion meets a requirement of the charging voltage expected by the battery.

Limited by a poor conversion efficiency of the conversion circuit, unconverted electric energy is dissipated in a form of heat, and the heat may be accumulated inside the device to be charged. A design space and a space for heat dissipation of the device to be charged are small (for example, the physical size of a mobile terminal used by a user becomes thinner and thinner, while plenty of electronic elements are densely arranged in the mobile terminal to improve performance of the mobile terminal), which not only increases difficulty in designing the conversion circuit, but also results in that it is hard to dissipate the heat accumulated in the device to be charged in time, thus further causing an abnormity of the device to be charged.

For example, the heat accumulated in the conversion circuit may cause a thermal interference on electronic components neighboring the conversion circuit, which may cause abnormal operations of the electronic elements. As another example, the heat accumulated in the conversion circuit may shorten a service life of the conversion circuit and the neighboring electronic components. For another example, the heat accumulated in the conversion circuit may cause a thermal interference on the battery, thereby causing an abnormal charging and discharging of the battery. For example, the heat accumulated in the conversion circuit may increase a temperature of the device to be charged, which affects a use experience during charging. For another example, the heat accumulated in the conversion circuit may cause a short circuit of the conversion circuit, such that the voltage outputted by the power supply device is directly applied to both ends of the battery, thus causing an abnormity in charging of the battery, which brings safety hazard if the over-voltage charging lasts for a long period of time, for example, the battery may explode.

The power supply device mentioned in the embodiments of the present disclosure may be a power supply device with an adjustable output voltage. The power supply device is capable of acquiring status information of the battery. The status information of the battery may include current electric quantity information and/or voltage information of the battery. The power supply device may adjust the voltage output by itself according to the acquired status information of the battery so as to meet the requirement of the charging voltage and/or charging current expected by the battery. The adjusted voltage output by the power supply device may be directly applied to the two ends of the battery to charge the battery (hereinafter referred to as "direct charging"). Further, in the constant-current charging stage of the charging process of the battery, the adjusted voltage output by the power supply device may be directly applied to the two ends of the battery to charge the battery.

The power supply device may have the function of the voltage feedback module and the function of the current feedback module to realize the management of the charging voltage and/or charging current of the battery.

The power supply device adjusts the voltage output by itself according to the acquired status information of the battery, which may refer to that: the power supply device may acquire the status information of the battery in real time, and adjust the voltage output by itself according to the status information of the battery, acquired in real time at every time, so as to meet the requirement of the charging voltage and/or charging current expected by the battery.

The power supply device adjusts the voltage output by itself according to the status information of the battery, acquired in real time, which may refer to: with the increasing of the charging voltage of the battery during the charging process, the power supply device may acquire the current status information of the battery at different moments during the charging process, and adjust the voltage output by the power supply device in real time according to the current status information of the battery so as to meet the requirement of the charging voltage and/or charging current expected by the battery.

For example, the charging process of the battery may include at least one of the trickle charging stage, the constant-current charging stage, and the constant-voltage charging stage. In the trickle charging stage, the power supply device may output a first charging current to charge the battery in the trickle charging stage to meet the requirement of the charging current expected by the battery (the first charging current may be a constant direct current). In the constant-current charging stage, the power supply device may utilize the current/voltage feedback loop, such that the current output by the power supply device and flowing into the battery during the constant-current charging stage meets the requirement of the charging current expected by the battery (for example, the second charging current may be a current with a pulsating waveform; the second charging current may be greater than the first charging current, which may be that a peak value of the current with the pulsating waveform in the constant-current charging stage is greater than the constant direct current in the trickle charging stage; and the constant direct current of the constant-current charging stage may mean that the peak value or an average value of the current with the pulsating waveform remains substantially constant). In the constant-voltage charging stage, the power supply device may utilize the voltage/current feedback loop such that the voltage output by the power supply device to the device to be charged (i.e., a constant direct current voltage), remains constant during the constant-voltage charging stage.

The charging process described above may be applied to the charging process of the battery including the single cell, and also to the charging process of the battery including a plurality of cells.

For a battery including a plurality of cells coupled in series, the charging stage of the battery may also include the trickle charging stage, the constant-current charging stage, and the constant-voltage charging stage, and the charging process of each stage is similar to the charging process described above. In each charging stage, the magnitude of the charging voltage/current provided by the power supply device meets a requirement of a total voltage/current expected by the plurality of cells in each stage.

In different charging stages, the charging voltage/current of each cell in the plurality of cells needs to maintain balance, that is, it needs the consistent voltage across each cell. In the trickle charging stage, the voltage across two ends of each cell in the plurality of cells may be kept to be consistent, and the current flowing into each cell meets the requirement of the current expected by the cell during the trickle charging stage. In the constant-current charging stage, the voltage across two ends of each cell in the plurality of cells may be kept to be consistent, and the current flowing into each cell meets the requirement of the current expected by the cell during the constant-current charging stage. In the constant-voltage charging stage, the voltages across two ends of each cell in the plurality of cells may be kept to be consistent, and the voltages across two ends of each cell meet the requirement of the voltage expected by the cell during the constant-voltage charging stage.

For example, the power supply device mentioned in the embodiments of the present disclosure may be configured to control the constant-current charging stage of the battery in the device to be charged. In other embodiments, a control function of the trickle charging stage and the constant-voltage charging stage of the battery in the device to be charged may also be cooperatively completed by additional charging chips in the power supply device and in the device to be charged, mentioned in the embodiments of the present disclosure. Compared with the constant-current charging stage, a charging power received by the battery during the trickle charging stage and the constant-voltage charging stage is smaller, and an efficiency conversion loss and a heat accumulation of the charging chip in the device to be charged are acceptable. It should be noted that, the constant-current charging stage or the constant-current stage mentioned in the embodiment of the present disclosure may refer to a charging mode for controlling the output current of the power supply device, and may not require that the output current of the power supply device is kept to be constant completely, for example, it may generally refer to that the peak value or the average value of the current with the pulsating waveform output by the power supply device is kept substantially to be constant, or to be constant in a period of time. For example, in practice, the power supply device charges usually in a multi-stage constant-current manner during the constant-current charging stage.

The multi-stage constant-current charging may include N constant-current stages (N is an integer not smaller than 2). The first stage of the multi-stage constant-current charging starts with a preset charging current. The N constant-current stages in the multi-stage constant-current charging are performed in sequence from the first stage to the $(N-1)^{th}$ stage. After a previous constant-current stage in the constant-current stages is switched to a next constant-current stage, the peak value or average value of the current with the pulsating waveform may be decreased. When the battery voltage reaches a corresponding charging cut-off voltage threshold, the previous constant-current stage in the constant-current stages is switched to the next constant-current stage. The current between two adjacent constant-current stages may be changeable gradually, or may be changeable in a stepped skip manner.

Further, in the case that the output current of the power supply device is a pulsating direct current, a constant-current mode may refer to a charging mode for controlling the peak value or the average value of the pulsating direct current, that is, controlling the peak value of the output current of the power supply device not to exceed the current corresponding to the constant-current mode. In addition, in the case that the output current of the power supply device is an alternating current, the constant-current mode may refer to the charging mode in which the peak value of the alternating current is controlled.

Further, it should be noted that, the device to be charged in the embodiments of the present disclosure may refer to a terminal. The "terminal" may include, but be not limited to a device configured to receive/transmit communication signals via a wired connection (for example, public switched telephone network (PSTN), digital subscriber line (DSL) connection, digital cable connection, direct cable connection and/or another data connection/network) and/or via a wireless interface (for example, cellular network, wireless local area network (WLAN), digital TV network such as digital video broadcasting handheld (DVB-H) network, satellite network, an amplitude modulation-frequency modulation (AM-FM) broadcasting transmitter, and/or a wireless interface of another communication terminal). The terminal configured to communicate via the wireless interface may be referred to as "wireless communication terminal", "wireless terminal" and/or "mobile terminal". Examples of the mobile terminal include, but are not limited to a satellite phone or a cell phone, a terminal combining a cell radio phone and a personal communication system (PCS) having capability of data process, fax, and data communication, a personal digital assistant (PDA) including a radio phone, a pager, Internet/Intranet access, a web browser, a note pad & address book, a calendar and/or a global positioning system (GPS) receiver, and a common laptop and/or handheld receiver, or other electronic devices including a radio phone transceiver In addition, the device to be charged or the terminal in the embodiment of the present disclosure may further include a power bank. The power bank may be capable of accepting the charging of the power supply device, so as to store energy to supply energy to other electronic devices.

In addition, in the embodiment of the present disclosure, when the voltage with the pulsating waveform, output by the power supply device, is directly applied to the battery of the device to be charged to charge the battery, the charging current may be characterized in the form of a pulsating wave (such as a steamed bun waveform). It will be appreciated that the charging current may charge the battery in an intermittent manner. A period of the charging current may vary with a frequency of an input alternating current (such as a frequency of an alternating current power grid). For example, the frequency corresponding to the period of the charging current may be an integral multiple or a fraction of the frequency of the power grid. Moreover, when the charging current is used to charge the battery intermittently, a current waveform corresponding to the charging current may be formed of one pulse or a set of pulses synchronous to the power grid.

As an example, in the embodiment of the present disclosure, the battery may receive a pulsating direct current (with constant direction and amplitude changing with time), an alternating current (with both direction and amplitude changing with time), or a direct current (i.e. the constant direct current, with both amplitude and direction not changing with time) output by the power supply device during the charging process (e.g. at least one of the trickle charging stage, the constant-current charging stage, and the constant-voltage charging stage).

For a conventional device to be charged, it usually includes a single cell. When a large charging current is used to charge the single cell, the heating phenomenon of the device to be charged is relatively serious. In order to guarantee a charging speed and alleviate the heating phenomenon of the device to be charged during the charging process, the embodiment of the present disclosure reforms a cell structure in the device to be charged, introduces the battery with a series cell structure, and provides a charging control apparatus capable of performing the direct charging on the battery with the series cell structure. On the premise of the same charging speed, the charging current required by the battery with the series cell structure is 1/N of the charging current required by the battery with the single cell structure (N is the number of the cells which are mutually coupled in series in the device to be charged). Therefore, on the premise of the same charging speed, a charging current acquired by the charging control apparatus provided by the embodiment of the present disclosure, from an external power supply device, is smaller, thereby reducing a heating amount during the charging process.

For example, for a battery with a single cell of 3000 mAh, to achieve a charging rate of 3 C, a charging current of 9 A is required. In order to achieve the same charging speed and reduce the heating amount of the device to be charged during the charging process, two cells of 1500 mAh may be coupled in series to replace the single cell of 3000 mAh, so that a charging current of 4.5 A is required to achieve the charging rate of 3 C, and the heating amount caused by the charging current of 4.5 A is significantly lower than that caused by the charging current of 9 A.

Currently, there are different types of power supply devices, and the different types of power supply devices may charge devices to be charged which include different numbers of cells. Some power supply devices may charge the plurality of cells, such as some power supply devices may charge two cells; some power supply devices may charge a part of the plurality of cells, such as some power supply devices may charge one cell and may not charge two or more cells.

The output voltages/currents of the different types of power supply devices are different. The output voltage/current of the first-type power supply device needs to be greater than the total voltage/current of the plurality of cells, and the output voltage/current of the second-type power supply device needs to be greater than the total voltage/current of the part of the cells. The output voltage/current of the first-type power supply device is greater than the output voltage/current of the second-type power supply device.

For example, the first-type power supply device may charge the device to be charged including two cells, and the output voltage of the first-type power supply device needs to be greater than the total voltage of the two cells. Taking the operating voltage of one cell being 3.0V-4.35V as an example, the output voltage of the first-type power supply device needs to be greater than 6V-8.7V. The second-type power supply device may charge the device to be charged including the single cell, and the output voltage of the second-type power supply device needs to be greater than the voltage of the single cell. Taking the operating voltage of one cell being 3.0V-4.35V as an example, the output voltage of the second-type power supply device needs to be greater than 3.0V-4.35V.

For the device to be charged including the plurality of cells, it may receive a charging signal provided by the first-type power supply device for charging, but may not receive a charging signal provided by the second-type power supply device for charging. Therefore, the device to be charged including the plurality of cells may have a problem that it may not be compatible with the different types of power supply devices for charging.

The embodiment of the present disclosure provides a charging control apparatus, which may be compatible with the different types of power supply devices, so that the device to be charged may be charged by the different power supply devices.

FIG. 1 is a schematic block diagram of a charging system according to an embodiment of the present disclosure. This charging system may include: a power supply device 10, a charging control apparatus 20 and a battery 30. The charging control apparatus may be configured to manage the battery 30. As an example, the charging control apparatus 20 may manage the charging process of the battery 30, such as selecting a charging channel, controlling a charging voltage and/or charging current; as another example, the charging control apparatus 20 may manage cells of the battery 30, such as equalizing voltages of the cells in the battery 30.

The charging control apparatus may include a first charging channel 21, and a second charging channel 28.

The first charging channel 21 may be configured to charge a plurality of cells coupled in series according to a charging signal provided by the first-type power supply device.

The first charging channel 21 may receive the charging voltage and/or the charging current provided by the first-type power supply device, for example, and apply the charging voltage and/or the charging current to two ends of the battery 30 to charge the battery 30. The charging signal provided by the first-type power supply device may be adapted to the total voltage of the plurality of cells. For example, the charging voltage provided by the first-type power supply device may be equal to or higher than the total voltage of the plurality of cells.

The second charging channel 28 may be configured to charge a part of the plurality of cells according to a charging signal provided by the second-type power supply device.

The second charging channel 28 may receive the charging voltage and/or the charging current provided by the second-type power supply device, for example, and apply the charging voltage and/or the charging current to two ends of the part of the plurality of cells in the battery 30 to charge the part of the plurality of cells. The charging signal output by the second-type power supply device may be adapted to the total voltage of the part of the plurality of cells. For example, the charging voltage provided by the second-type power supply device may be equal to or higher than the total voltage of the part of the plurality of cells.

The power supply device 10 illustrated in FIG. 1 may be the first-type power supply device or may be the second-type power supply device.

The charging control apparatus may also detect the type of the power supply device coupled thereto, and select the charging channel according to the detected type of the power supply device.

Different types of power supply devices may be distinguished according to output voltages. When the output voltages are different, the types of power supply devices may be different. The charging control apparatus may detect the output voltage of the power supply device coupled with the charging control apparatus. Different charging channels are selected for charging according to different output voltages. For example, for the battery including two cells, when the output voltage of the power supply device is detected to be 10V, the first charging channel 21 may be adopted for charging, and when the output voltage of the power supply device is detected to be 5V, the second charging channel may be adopted for charging.

Different types of power supply devices may also be distinguished according to models of the power supply devices. When the device to be charged and the power supply device are both manufactured by a same manufacturer, the output voltages and/or the output currents corresponding to the power supply devices of different types are known for the device to be charged. Therefore, the charging control apparatus may detect the model of the power supply device, and may select the charging channel according to the model of the power supply device.

The embodiment of the present disclosure does not limit a manner of detecting the type of the power supply device. For example, the charging control apparatus may directly detect the type of the power supply device after the power supply device is coupled to the charging control apparatus. Alternatively, after the power supply device is coupled to the charging control apparatus, the charging control apparatus may communicate with the power supply device via a communication circuit, and the power supply device may transmit the model or the output voltage to the communication circuit.

The battery 30 in the embodiment of the present disclosure may include the plurality of cells (at least two cells) coupled in series with each other. The cells coupled in series may divide the charging voltage provided by the power supply device 10 during the charging process. A first cell 31*a* and a second cell 31*b* illustrated in FIG. 1 may be any two cells of the plurality of cells, or may be any two sets of cells of the plurality of cells. Taking the example that the first cell 31*a* (or the second cell 31*b*) includes a set of cells, each cell in the set of cells may be in a series connection relationship or a parallel connection relationship, which is not limited in this embodiment of the present disclosure.

The battery 30 may be a single battery or a plurality of batteries, in other words, the cells coupled in series in the embodiment of the present disclosure may be packaged into one battery pack to form the single battery, or packaged into a plurality of battery packs to form the plurality of batteries. For example, the battery 30 may be the single battery including the first cell 31*a* and the second cell 31*b* coupled in series with each other. For another example, the battery 30 may be two batteries, wherein one battery includes the first cell 31*a* and the other battery includes the second cell 31*b*.

In the technical solution according to the embodiment of the present disclosure, generally, for the device to be charged including the plurality of cells, the power supply device adapted to the device to be charged is the first-type power supply device, and the device to be charged may receive the charging signal provided by the first-type power supply device, to charge the plurality of cells. However, the second-type power supply device generally may not be used to charge the plurality of cells because its output voltage is lower than that of the first-type power supply device. According to the embodiment of the present disclosure, by setting the second charging channel, the second charging channel may receive the charging signal provided by the second-type power supply device, to charge the part of the plurality of cells according to the charging signal.

Therefore, according to the embodiment of the present disclosure, by setting the second charging channel, the charging control apparatus may be compatible with different power supply devices to charge the device to be charged, which includes the plurality of cells.

The forms of the first and second charging channels are described in detail below.

The first charging channel 21 may be the channel for charging the battery 30 by the above-described conventional power supply device 10. This power supply device 10 operates in the constant voltage mode, i.e. the output voltage of the power supply device 10 is fixed.

The conversion circuit may be disposed on the first charging channel. The conversion circuit may adjust the charging voltage and/or the charging current provided by the power supply device to meet the magnitude of the charging voltage and/or the charging current expected by the battery 30.

The first charging channel 21 may also be a direct charging channel, that is, the first charging channel 21 may be the channel for charging the battery 30 by the power supply device 10 with an adjustable output voltage. The first charging channel 21 may directly apply the charging signal provided by the power supply device 10 to both ends of the battery 30.

Likewise, the second charging channel 28 may be the channel for charging the battery 30 by the conventional power supply device 10. This power supply device 10 operates in the constant voltage mode, i.e. the output voltage of the power supply device 10 is fixed.

The conversion circuit may be disposed on the second charging channel 28. The conversion circuit may adjust the charging voltage and/or the charging current provided by the power supply device to meet the magnitude of the charging voltage and/or the charging current expected by the par of cells.

The second charging channel 28 may also be the direct charging channel, that is, the second charging channel 28 may be the channel for charging the battery 30 by the power supply device 10 with the adjustable output voltage. The second charging channel 28 may directly apply the charging signal provided by the power supply device 10 to both ends of the part of the plurality of cells.

The manner of direct charging will be described in detail below by taking the first charging channel 21 as an example.

The first charging channel 21 may directly apply the charging voltage and/or the charging current provided by the power supply device 10 to the two ends of the battery 30 to directly charge the battery 30. The related description of "direct charging" may be referred to the above, which is not elaborated here. The first charging channel 21 may also be referred to as the direct charging channel, and the conversion circuit such as a charging IC is not required to be disposed on the direct charging channel. In other words, the direct charging channel does not need to be like the conventional charging channel (i.e., the charging voltage and/or the charging current provided by the power supply device may be converted and then the converted charging voltage and/or charging current may be applied on two ends of the battery), but may directly apply the charging voltage and/or the charging current provided by the power supply device on two ends of the battery.

The first charging channel 21 may be, for example, a conducting wire, or some other circuit components unrelated to the conversion of the charging voltage and/or the charging current may be disposed on the first charging channel 21. For example, the charging control apparatus 20 includes the first charging channel 21, and a switching device (see the description of FIG. 2) for switching between the charging channels may be disposed on the first charging channel 21.

The power supply device 10 may be the power supply device with the adjustable output voltage, as described above, but the embodiment of the present disclosure does not limit the type of the power supply device 10. For example, the power supply device 10 may be a device dedicated to charging, such as an adapter and a mobile power bank, or may be another device capable of providing power and data services, such as a computer.

Figure 2:
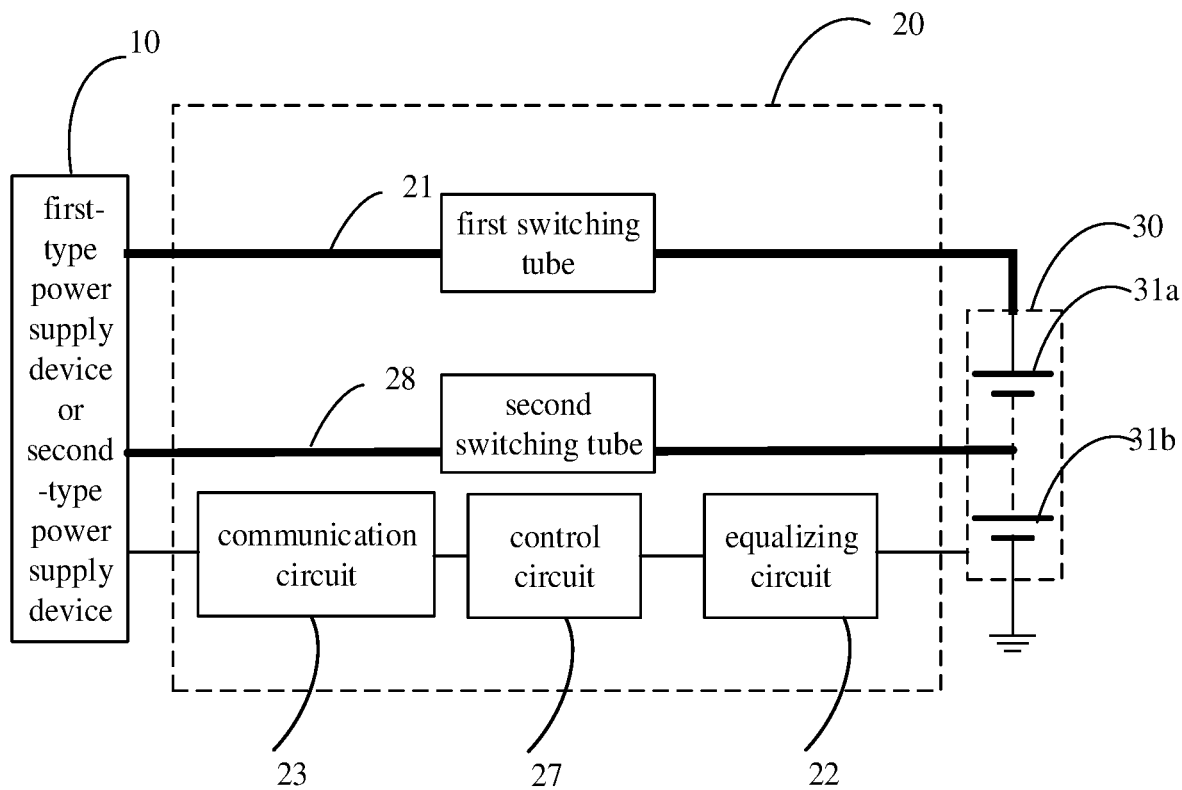
FIG. 2 is a schematic block diagram of another charging system according to an embodiment of the present disclosure.

The charging control apparatus according to the embodiment of the present disclosure may further include a communication circuit 23, as illustrated in FIG. 2. During the process that the power supply device 10 directly charges the battery 30 through the first charging channel 21, the communication circuit may communicate with the power supply device 10, so that the magnitude of the charging voltage and/or the charging current provided by the power supply device 10 matches the current charging stage of the battery 30 (or, the magnitude of the charging voltage and/or the charging current provided by the power supply device 10 may meet the requirement of the current charging stage of the battery 30 on the charging voltage and/or the charging current).

As already indicated above, the first charging channel 21 is the direct charging channel, and the charging voltage and/or the charging current provided by the power adapter 10 may be directly applied to the two ends of the battery 30. In order to implement the direct charging mode, the embodiment of the present disclosure introduces the communication circuit having a communication function, i.e., the communication circuit 23, into the charging control apparatus 20. The communication circuit 23 may maintain a communication with the power supply device 10 during the direct charging process to form a closed-loop feedback mechanism, so that the power supply device 10 may know the state of the battery in real time, thereby continuously adjusting the charging voltage and/or the charging current injected into the first charging channel to ensure that the magnitude of the charging voltage and/or the charging current provided by the power supply device 10 matches the current charging stage of the battery 30.

The charging stage in which the battery 30 is currently located may be any one of the trickle charging stage, the constant-voltage charging stage, and the constant-current charging stage.

Taking the trickle charging stage as an example, in the trickle charging stage of the battery 30, the communication circuit 23 may communicate with the power supply device 10 so that the power supply device 10 adjusts the charging current provided to the first charging channel 21, to enable that that the charging current matches the charging current corresponding to the trickle charging stage (or the charging current meets the requirement of the battery 30 for the charging current in the trickle charging stage).

Taking the constant-voltage charging stage as an example, in the constant-voltage charging stage of the battery 30, the communication circuit 23 may communicate with the power supply device 10 so that the power supply device 10 adjusts the charging voltage provided to the first charging channel 21, to enable that the charging voltage matches the charging voltage corresponding to the constant-voltage charging stage (or the charging voltage meets the requirement of the battery 30 for the charging voltage in the constant-voltage charging stage).

Taking the constant-current charging stage as an example, in the constant-current charging stage of the battery 30, the communication circuit 23 may communicate with the power supply device 10 so that the power supply device 10 adjusts the charging current provided to the first charging channel 21, to enable that the charging current matches the charging current corresponding to the constant-current charging stage (or the charging current meets the requirement of the battery 30 for the charging current in the constant-current charging stage).

A communication content and a communication mode between the communication circuit 23 and the power supply device 10 are not limited in the embodiments of the present disclosure, and will be described in detail with reference to embodiments, and details thereof are not repeated here.

It should be noted that, the above describes the direct charging process using the first charging channel 21 as an example. The above-described direct charging process is also applicable to the second charging channel 28. The power supply device 10 may maintain the communication with the communication circuit 23 during the process of performing direct charging on the part of the plurality of cells through the second charging channel 28, so that the power supply device 10 may continuously adjust the charging voltage and/or the charging current injected into the second charging channel, so as to ensure that the magnitude of the charging voltage and/or the charging current provided by the power supply device 10 matches the current charging stage of the part of the plurality of cells.

During the process of charging the part of the plurality of cells through the second charging channel 28, a voltage imbalance may be caused among the plurality of cells. For example, the voltage(s) of the part of the plurality of cells being charged is relatively high, and the voltage(s) of other cells not being charged is relatively low.

Taking the battery 30 including two cells (the cell 31*a* and the cell 31*b*) as an example, the second charging channel may be used to charge the cell 31*b* according to the embodiment of the present disclosure. During a charging process using the second charging channel, since the cell 31*b* is being charged and the cell 31*a* is not being charged, a voltage difference may exist between the cell 31*a* and the cell 31*b*, and the voltage difference may increase with an increase in the charging time, resulting in an imbalance in the voltages between the cell 31*a* and the cell 31*b*.

The charging control apparatus 20 according to the embodiment of the present disclosure may further include an equalizing circuit 22, which may equalize voltages of the plurality of cells in the battery 30, so that parameters of the cells coupled in series are close to each other, thereby facilitating a unified management of the cells inside the battery. Further, when the battery includes the plurality of cells, an overall performance and a service life of the battery may be improved by keeping the parameters among the cells consistent.

As illustrated in FIG. 2, the charging control apparatus 20 according to the embodiment of the present disclosure may further include a control circuit 27. The control circuit 27 is configured to control the second charging channel to operate and control the equalizing circuit to operate when it is detected that the second-type power supply device is coupled to the charging control apparatus; and/or the control circuit is configured to control the first charging channel to operate and control the equalizing circuit to stop operating when it is detected that the first-type power supply device is coupled with the charging control apparatus.

Optionally, during the process of charging the battery 30 through the first charging channel 21 by the first-type power supply device, the control circuit 27 may not stop the operation of the equalizing circuit, and the equalizing circuit may equalize the voltages among the plurality of cells in real time during the charging process.

There are various ways in which the control circuit controls the charging channel to operate. For example, a switching tube may be disposed on the charging channel, and the control circuit controls the charging channel to operate or stop operating by controlling the switching tube to be turned on or off.

The switching tube mentioned in the embodiments of the present disclosure may be a Metal Oxide Semiconductor (MOS) tube.

For example, a first switching tube may be disposed on the first charging channel 21, and a second switching tube may be disposed on the second charging channel. When the connection between the second-type power supply device and the charging control apparatus is detected, the control circuit may control the first switching tube to be turned off and control the second switching tube to be turned on. At this moment, the second charging channel operates, and the first charging channel does not operate. The second-type power supply device may charge the part of the plurality of cells (e.g., the cell 31*b*) through the second charging channel. While the control circuit may control the equalizing circuit to operate, to equalize the voltages between the cells 31*a* and 31*b*.

When detecting that the first-type power supply device is coupled with the charging control apparatus, the control circuit may control the first switching tube to be turned on and control the second switching tube to be turned off. At this moment, the first charging channel operates, and the second charging channel does not operate. The first-type power supply device may charge the plurality of cells through the first charging channel. Generally, during the process that the first-type power supply device charges the plurality of cells, the voltages among the plurality of cells are relatively balanced, and at this time, the control circuit may control the equalizing circuit to be out of operation.

The above is an example. The control circuit may not control the equalizing circuit to operate or stop operating, and the equalizing circuit may be in an operating state all the time. Or, during the charging process through the first charging channel, the control circuit may also control the equalizing circuit to operate, so that during the charging process through the first charging channel, the operating voltage of each of the plurality of cells may also be balanced.

Optionally, in some embodiments, during the process that the second charging channel operates, the control circuit may determine, according to the magnitude of the charging current provided by the second-type power supply device, a magnitude of an equalizing current in the equalizing circuit, so as to ensure that the current flowing into the part of the plurality of cells is equal to the current flowing into the remaining of the plurality of cells.

The equalizing circuit may transfer the electric quantity of the cell(s) being charged to the uncharged cell(s). During the process of transferring the electric quantity, the equalizing circuit may provide the uncharged cell(s) with the current having the magnitude equal to the magnitude of an actual current flowing into the part being charged. The actual current flowing into the part of the plurality of cells may be understood as a difference value between the current provided by the power supply device for the part of the plurality of cells and the equalizing current provided by the part of the plurality of cells to the equalizing circuit.

For example, when the second-type power supply device charges the cell 31*b*, and when the charging current of the second-type power supply device is 4 A, the magnitude of the equalizing current in the equalizing circuit may be 2 A. That is, the equalizing circuit may provide the current of 2 A for the cell 31*a*, and at this time, the actual current flowing into the cell 31*b* is also 2 A, which may ensure that the currents flowing into the cell 31*a* and the cell 31*b* are equal.

In addition, the plurality of cells may have inconsistent characteristics. Even if the current flowing into each cell is guaranteed to be equal, the current voltage of each cell may also be unequal. Therefore, in order to ensure that the voltages among the plurality of cells are more balanced, the charging control apparatus is further configured to acquire current electric quantities and/or current voltages of the plurality of cells; the control circuit is further configured to adjust the magnitude of the equalizing current in the equalizing circuit according to one or more difference values among the current electric quantities and/or among the current voltages of the plurality of cells.

For example, in the case that the second-type power supply device charges the cell 31*b*, when the charging current of the second-type power supply device is 4 A, the magnitude of the equalizing current in the equalizing circuit may be 2 A, so that the currents flowing into the cells 31*a* and 31b are both 2 A. However, in the case that the characteristics of the cells 31a and 31b are not consistent, even if charging is performed with the same charging current, there is the case that the voltages across the cell 31a and across the cell 31b are inconsistent. Therefore, in the embodiment of the present disclosure, during the charging process, when the voltage of the cell 31a is higher than the voltage of the cell 31b, the control circuit may control the equalizing current in the equalizing circuit to be greater than 2 A; when the voltage of the cell 31b is higher than the voltage of the cell 31a, the control circuit may control the equalizing current in the equalizing circuit to be smaller than 2 A. Therefore, the control circuit may adjust the magnitude of the equalizing current in the equalizing circuit in real time according to the current electric quantities and/or the current voltages of the plurality of cells, and the voltages of the plurality of cells may be more balanced during the process of charging the part of the plurality of cells.

For the battery 30 including three or more cells, the equalizing circuit may implement individual equalization for uncharged cells. For example, when the uncharged cells are two cells, the equalizing circuit may respectively equalize the voltages of the two cells, that is, two equalizing circuits may be provided to equalize the voltages of the two cells correspondingly. Therefore, the equalizing circuits may individually adjust the currents in the different equalizing circuits according to the current electric quantities and/or the current voltages of different cells, so that the voltages of the plurality of cells may be ensured to be more balanced.

In addition, in the embodiment of the present disclosure, after the charging of the battery 30 is finished, that is, after the power supply device is decoupled from the charging control apparatus, the current electric quantities and/or the current voltages of the plurality of cells in the battery 30 may also be detected. When the current electric quantities and/or the current voltages of the plurality of cells are inconsistent, the control circuit may control the equalizing circuit to operate so as to balance the voltages of the plurality of cells. Therefore, the accurate balance of the voltages of the plurality of cells may be further ensured.

In the above description, the battery 30 includes two cells as an example. When the battery 30 includes three or more cells, the first charging channel and the second charging channel may also be provided on the charging control apparatus, for example, the second charging channel may charge one or two or more cells.

In addition, according to the embodiments of the present disclosure, it may also dispose the charging channel on each cell, i.e., each cell may be charged individually. The control circuit may control the switching tubes on the charging channels to realize adopting which charging channel to charge, and may select the cell to charge in a flexible way like this. When a certain cell in the plurality of cells is damaged or the performance of the cell is reduced, the control circuit may more flexibly select other cells to charge.

The disposing manner of the charging channel is not limited in the embodiment of the present disclosure. For example, an individual charging channel may be disposed for each cell in the plurality of cells. For example, one charging channel may be disposed for every two cells in the plurality of cells. For example, the charging channel may be individually disposed for each cell in the part of the cells, and one charging channel may be disposed for every two cells in another part of the cells.

The equalizing circuit may be implemented in various manners. For example, the equalizing circuit may be a Cuk circuit, or the equalizing circuit may be an equalizing circuit based on an RLC series circuit, or the equalizing circuit may be an equalizing circuit based on Buck-Boost.

The following describes in detail an implementation of the equalizing circuit according to the embodiment of the present disclosure.

The Cuk circuit may also sometimes be referred to as a Cuk chopper circuit. The Cuk circuit is often used for a DC/DC conversion. Therefore, the Cuk circuit may also sometimes be referred to as the Cuk converter.

In the embodiment of the present disclosure, when the Cuk circuit operates, an energy transfer direction between the first cell 31a and the second cell 31b is not limited. A unidirectional energy transfer or a bidirectional energy transfer may be performed. Next, a bidirectional energy transfer process between the first cell 31a and the second cell 31b is illustrated by taking FIG. 3 as an example.

Figure 3:
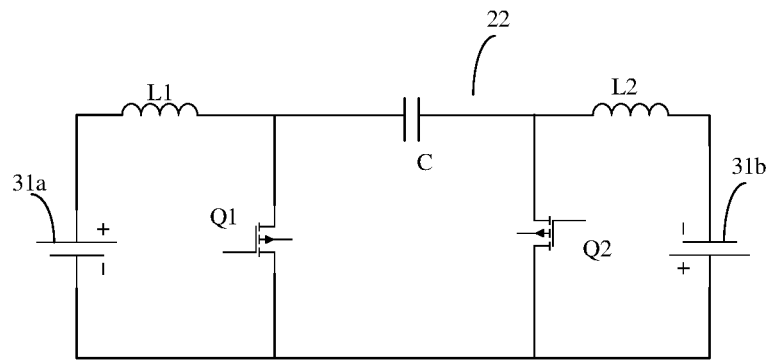
FIG. 3 is a schematic diagram of a connection relationship between an equalizing circuit and a cell according to an embodiment of the present disclosure.

As illustrated in FIG. 3, both ends of the Cuk circuit are coupled to the first cell 31a and the second cell 31b. The first cell 31a and the second cell 31b are isolated from each other by a capacitor C, and the first cell 31a and the second cell 31b may transfer energy by the capacitor C. The capacitance value of the capacitor C is not limited in the embodiment of the present disclosure. For example, the capacitance value of the capacitor C may be set to be large enough, so that the capacitor C is always in a steady state during the operating process of the Cuk circuit, and the voltage across two ends of the capacitor C is basically unchanged. An inductor L1 and an inductor L2 are correspondingly disposed at two sides near the first cell 31a and the second cell 31b, and the disposition of the inductors L1 and L2 may significantly reduce a current pulsation in the Cuk circuit. In practical circuit configuration, the inductor L1 and the inductor L2 may be set very close, so that the inductor L1 and the inductor L2 generate mutual inductance, thereby further reducing the current pulsation in the Cuk circuit. Further, the Cuk circuit may include two switching tubes Q1 and Q2 (the switching tube Q1 and the switching tube Q2 both may be Metal Oxide Semiconductor (MOS) tubes). When the voltages of the first cell 31a and the second cell 31b are balanced, the switching tube Q1 and the switching tube Q2 are both in an off state, and at this time, the Cuk circuit does not operate. When the voltages of the first cell 31a and the second cell 31b are unbalanced, the control circuit 27 may transmit a driving signal to the switching tube Q1 and the switching tube Q2 according to a certain timing, so as to control the energy transfer direction and the energy transfer speed between the first cell 31a and the second cell 31b.

Taking an example that the voltage of the first cell 31a is greater than the voltage of the second cell 31b, and the control circuit 27 needs to transfer the energy of the first cell 31a to the second cell 31b, the control circuit 27 may alternately execute the following control logic: firstly, the switching tube Q1 is controlled to be turned on, and the switching tube Q2 is turned off; then the switching tube Q1 is controlled to be turned off, and the switching tube Q2 is turned on.

Figure 4:
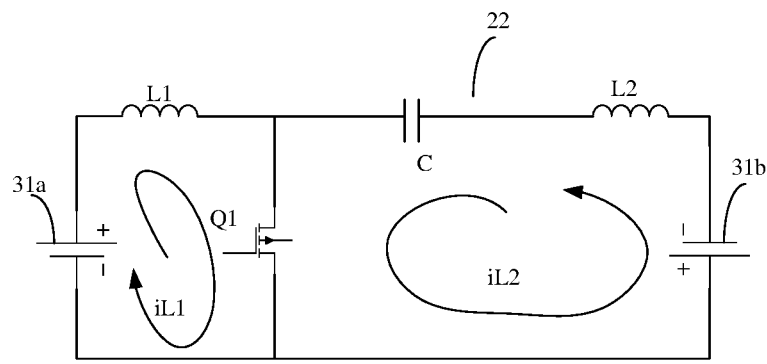
FIG. 4 is a schematic diagram of an operating state of a Cuk circuit according to an embodiment of the present disclosure.

In the process that the switching tube Q1 is turned on and the switching tube Q2 is turned off, as illustrated in FIG. 4, the first cell 31a and the inductor L1 form a closed loop (hereinafter referred to as a closed loop 1); the capacitor C, the inductor L2, and the second cell 31b form the closed loop (hereinafter referred to as a closed loop 2). In the closed loop 1, the first cell 31a supplies energy to the inductor L1 through the current iL1, so that the inductor L1 stores energy. In the closed loop 2, the capacitor C discharges, energy is supplied to the second cell 31b, and energy is stored in the inductor L2.

Figure 5:
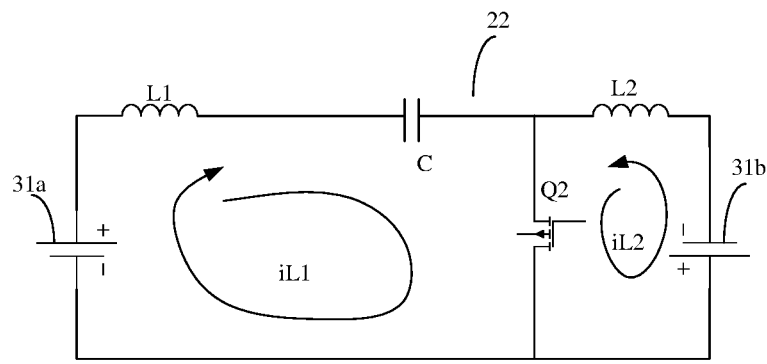
FIG. 5 is a schematic diagram of another operating state of a Cuk circuit according to an embodiment of the present disclosure.

In the process that the switching tube Q1 is turned off and the switching tube Q2 is turned on, as illustrated in FIG. 5, the first cell 31a, the inductor L1 and the capacitor C form the closed loop (hereinafter referred to as a closed loop 3); the inductor L2 and the second cell 31b form the closed loop (hereinafter referred to as a closed loop 4). In the closed loop 3, the first cell 31a and the inductor L1 provide energy to charge the capacitor C. In the closed circuit 4, the inductor L2 releases the stored energy to the second cell 31b.

Through the above-described process, the energy of the first cell 31a may be transferred to the second cell 31b. From a perspective of the electric quantity, the electric quantity of the first cell 31a decreases, and the electric quantity of the second cell 31b increases, which is equivalent to moving the electric quantity in the first cell 31a to the second cell 31b.

As may be seen from FIG. 3, the Cuk circuit used in the embodiment of the present disclosure is a Cuk circuit having a symmetric structure. When the voltage of the second cell 31b is greater than the voltage of the first cell 31a and energy of the second cell 31b needs to be transferred to the first cell 31a, the control circuit 27 may perform an on-off control on the switching tubes Q1 and Q2 according to a switching control manner opposite to the switching control manner described above, so as to transfer the energy from the second cell 31b to the first cell 31a.

It should be understood that, in FIG. 3 to 5, the equalizing circuit is a Cuk circuit having a symmetric structure, and the bidirectional energy transfer between the first cell 31a and the second cell 31b is illustrative, but the embodiment of the present disclosure is not limited thereto. The equalizing circuit 22 may also be a Cuk circuit having an asymmetric structure, and is responsible for transferring the energy of the first cell 31a to the second cell 31b, or is responsible for transferring the energy of the second cell 31b to the first cell 31a. For example, the switching tube Q2 in FIG. 3 may be replaced by a freewheeling diode, and such Cuk circuit may transfer the energy of the first cell 31a to the second cell 31b, but may not transfer the energy of the second cell 31b to the first cell 31a; for another example, the switching tube Q1 in FIG. 3 may be replaced by the freewheeling diode, and such Cuk circuit may transfer the energy of the second cell 31b to the first cell 31a, but may not transfer the energy of the first cell 31a to the second cell 31b.

It should be understood that there may be various ways to define a voltage imbalance between the first cell 31a and the second cell 31b, and this is not limited in this embodiment of the present disclosure. As an example, as long as the current voltages and/or the current electric quantities between the first cell 31a and the second cell 31b are not equal, it is determined that the voltages of the first cell 31a and the second cell 31b are not balanced; as another example, the imbalance of the first cell 31a and the second cell 31b may refer to that: the current voltages and/or the current electric quantities between the first cell 31a and the second cell 31b are not equal, and the difference value between the current voltages and/or between the current electric quantities of the first cell 31a and the second cell 31b meets a certain preset condition, for example, the difference value between the current voltages and/or between the current electric quantities of the first cell 31a and the second cell 31b is greater than a preset threshold.

For the battery 30 including three or more cells, the voltage imbalance among the cells may refer to that the current voltages and/or the current electric quantities of the cells are not equal; or, a maximum difference value or a minimum difference value among the current voltages and/or among the current electric quantities in the plurality of cells may also meet the certain preset condition, for example, the maximum difference value of the current voltages and/or of the current electric quantities in the plurality of cells is greater than the preset threshold.

Similarly, the control circuit 27 equalizing the voltages of the first cell 31a and the second cell 31b through the Cuk circuit may refer to that: the control circuit 27 adjusts the voltages of the first cell 31a and the second cell 31b via the Cuk circuit such that the voltages of the first cell 31a and the second cell 31b are equal; alternatively, the control circuit 27 equalizing the voltages of the first cell 31a and the second cell 31b through the Cuk circuit may refer to that: the control circuit 27 reduces the difference value between the current voltages and/or between the current electric quantities of the first and second cells 31a and 31b to below a certain threshold by the Cuk circuit.

Taking FIG. 5 as an example, the control circuit 27 may be coupled to positive poles of the first cell 31a and the second cell 31b to detect current voltages of the first cell 31a and the second cell 31b. When the difference value between the current voltages of the first cell 31a and the second cell 31b is greater than the preset threshold, the control circuit 27 transmits the driving signal to the Cuk circuit to drive the Cuk circuit to operate. Or, the control circuit 27 may also monitor the current electric quantities of the first cell 31a and the second cell 31b. When the difference value between the current electric quantities of the first cell 31a and the second cell 31b is greater than the preset threshold, the control circuit 27 transmits the driving signal to the Cuk circuit to drive the Cuk circuit to operate.

The driving signal may be, for example, a Pulse Width Modulation (PWM) signal, or another type of control signal capable of controlling the switching tubes to be turned on or off.

The circuit form of the control circuit 27 is not limited in the embodiment of the present disclosure. For example, the control circuit 27 may include a Micro Controller Unit (MCU) and a switching tube driver (for example, a MOS tube driver). The MCU may be configured to communicate with the power supply device 10. The MCU may also be configured to decide whether to perform the energy transfer between the first cell 31a and the second cell 31b, and decide the energy transfer direction between the first cell 31a and the second cell 31b. After the MCU determines that energy is transferred between the first cell 31a and the second cell 31b, and determines the energy transfer direction between the first cell 31a and the second cell 31b, the switching tube driver may control on-off timing of the switching tube Q1 and the switching tube Q2, so as to implement the energy transfer between the first cell 31a and the second cell 31b through the Cuk circuit.

Optionally, in some embodiments, during the operation of the Cuk circuit, the control circuit 27 may be further configured to adjust a duty ratio of the driving signal to adjust the magnitude of the current in the Cuk circuit. It is understood that the greater the current in the Cuk circuit, the faster an energy transfer speed between the first cell 31a and the second cell 31b, and the higher an efficiency of the voltage equalization of the first cell 31a and the second cell 31b.

The charging control apparatus 20 according to the embodiment of the present disclosure may adjust the energy transfer speed of the first cell 31a and the second cell 31b, so that the charging control apparatus 20 is more intelligent in the voltage management manner of the first cell 31a and the second cell 31b.

Figure 7:
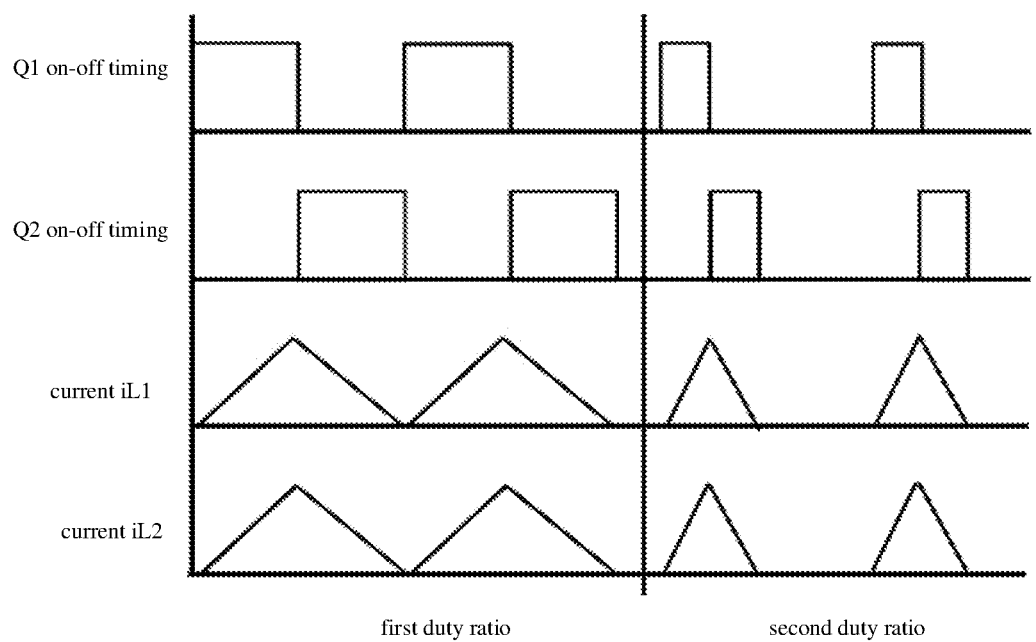
FIG. 7 is a control timing chart of a switching tube in a Cuk circuit according to an embodiment of the present disclosure.

A left side of FIG. 7 illustrates the on-off timing of the switching tubes Q1 and Q2 and the waveforms of the currents iL1 and iL2 in the Cuk circuit when the duty ratio of the driving signal is the first duty ratio. A right side of FIG. 7 illustrates the on-off timing of the switching tubes Q1 and Q2 and the waveforms of the currents iL1 and iL2 in the Cuk circuit when the duty ratio of the driving signal is the second duty ratio. The first duty ratio is greater than the second duty ratio.

As may be seen from FIG. 7, when the duty ratio of the driving signal is relatively larger, the on-time of the switching tubes Q1 and Q2 is correspondingly longer, the current in the Cuk circuit (the currents iL1 and iL2) is correspondingly larger, and the energy transfer speed between the first cell 31*a* and the second cell 31*b* is correspondingly faster.

The equalizing circuit equalizes the voltages of the plurality of cells in the battery 30. The equalizing circuit may be used to equalize the voltages of the plurality of cells in the process in which the battery 30 supplies power to a system of the device to be charged, in addition to equalizing the voltages of the plurality of cells in the process in which the power supply device charges the battery 30.

For example, when the second cell 31*b* is charged using the second charging channel 28, the voltage of the second cell 31*b* is higher than that of the first cell 31*a*, and the voltages between the cells 31*a* and 31*b* are imbalanced. In such case, the voltages of the cells 31*a* and 31*b* may be equalized by the equalizing circuit 22. For example, when the cell 31*a* is adopted to supply power to the system, the voltage of the cell 31*a* may reduce due to the power supply, and the voltage of the cell 31*b* that is not supplied may be higher than the voltage of the cell 31*a*. In such case, the voltages of the cells 31*a* and 31*b* may be equalized by the equalizing circuit 22.

Optionally, in some embodiments, the battery 30 may supply power to the system by using a manner of multi-cell power supply. In detail, a voltage step-down circuit may be added to the power supply circuit of the device 40 to be charged, so that the reduced voltage meets the requirement of the device 40 to be charged on the power supply voltage.

Taking a range of the operating voltage of the single cell being 3.0V-4.35V as an example, in order to ensure that the power supply voltage of the system of the device to be charged is normal, the voltage step-down circuit may reduce the total voltage of the battery 30 to any value within the range of 3.0V-4.35V, for example, the voltage step-down circuit may reduce the total voltage of the battery 30 to about 3.3V. The voltage step-down circuit may be implemented in various ways, for example, the voltage step-down circuit may be implemented in the form of a Buck circuit, a charge pump, or other circuits.

Optionally, in other embodiments, the input end of the power supply circuit of the device 40 to be charged may be coupled to both ends of any single cell in the battery 30. The power supply circuit may supply power to the system of the device 40 to be charged based on the voltage of the single cell.

It should be understood that ripples may occur in the voltage that is reduced by the voltage step-down circuit, so that a power supply quality of the device to be charged is affected. In the embodiment of the present disclosure, the single cell is still used to supply power to the system in the device to be charged, because the voltage output by the single cell is relatively stable. The embodiment of the present disclosure may ensure the power supply quality for the system of the device to be charged while solving a problem of supply power in the solution of the plurality of cells.

When the single cell is adopted for the power supply, the voltage imbalance among different cells in the battery 30 may occur. The voltage imbalance may cause a difficulty in a battery management, and an inconsistency of parameters of the cells inside the battery may cause a reduction in the service life of the battery. In the embodiment of the present disclosure, the equalizing circuit 22 may be used to equalize the voltages of the cells, so that the voltage balance among the cells in the battery 30 may be still maintained on the basis of a single-cell power supply solution.

Figure 6:
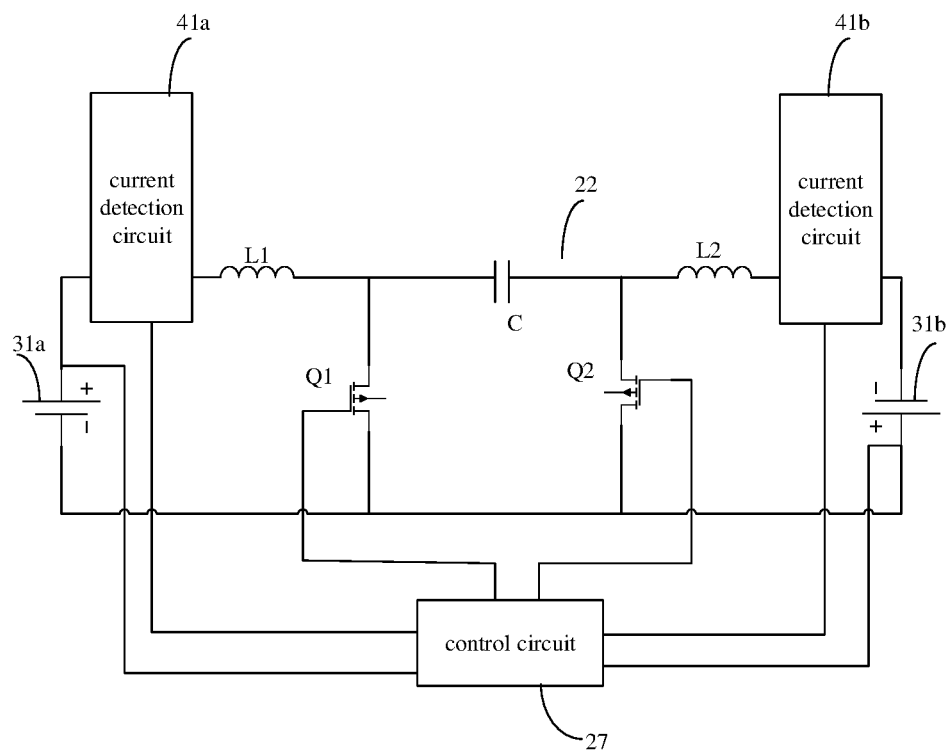
FIG. 6 is a schematic block diagram of a charging system according to another embodiment of the present disclosure.

Optionally, in some embodiments, as illustrated in FIG. 6, the charging control apparatus 20 may further include current detection circuits 41*a*, 41*b* for detecting the current in the Cuk circuit. Adjusting the duty ratio of the driving signal by the control circuit 27 to adjust the magnitude of the current in the Cuk circuit, described above, may include that: the control circuit 27 determines a target value of the current in the Cuk circuit according to the difference value between the current electric quantities and/or between the current voltages of the first cell 31*a* and the second cell 31*b*; the control circuit 27 adjusts the duty ratio of the driving signal so that the current of the Cuk circuit detected by the current detection circuits 41*a*, 41*b* reaches the target value.

As illustrated in FIGS. 4 and 5, the current in the Cuk circuit may include current iL1 and current iL2. It should be understood that FIG. 6 illustrates that the charging control apparatus 20 includes two current detection circuits 41*a* and 41*b*, where the current detection circuit 41*a* is used to detect the current iL1 in the Cuk circuit, and the current detection circuit 41*b* is used to detect the current iL2 in the Cuk circuit, but the embodiment of the present disclosure is not limited thereto. In some embodiments, the charging control apparatus 20 may also include one of the current detection circuits 41*a* and 41*b*.

It is assumed that the first cell 31*a* and the second cell 31*b* include a master cell and a slave cell, where the master cell is used for supplying power to the system. If the difference value between the current electric quantities and/or between the current voltages of the first cell 31*a* and the second cell 31*b* is large, it means that a load of the master cell is heavy, thus the current in the Cuk circuit may be increased; if the difference value between the current electric quantities and/or between the current voltages of the first cell 31*a* and the second cell 31*b* is small, it means that the load of the master cell is light, the current in the Cuk circuit may be reduced.

The manner of determining, by the control circuit 27, the target value of the current in the Cuk circuit according to the difference value between the current electric quantities and/or between the current voltages of the first cell 31*a* and the second cell 31*b* in the embodiment of the present disclosure is not limited. As an example, a corresponding relationship between difference values between voltages and/or between electric quantities of the first cell 31*a* and the second cell 31*b*, and current values in the Cuk circuit may be preset and configured. In an actual operating process, the target value of the current in the Cuk circuit, which corresponds to the difference value between the current voltages and/or between the current electric quantities of the first cell 31*a* and the second cell 31*b*, may be determined by using the corresponding relationship. As another example, the target value of the current in the Cuk circuit may be determined in consideration of the difference value between the current voltages and/or between the current electric quantities of the first and second cells 31*a* and 31*b*, the present temperature of the device to be charged (or the battery of the device to be charged), and the like. For example, when the difference value between the current voltages and/or between the current electric quantities of the first cell 31a and the second cell 31b is large, but the temperature of the battery of the device to be charged is also high, the target value of the current in the Cuk circuit may be set to a small value, so as to prevent the temperature of the device to be charged (or the battery of the device to be charged) from further increasing. When the difference value between the current voltages and/or between the current electric quantities of the first cell 31a and the second cell 31b is large, and the temperature of the battery of the device to be charged is also low, the target value of the current in the Cuk circuit may be set to a large value, so as to accelerate the efficiency of the voltage equalization of the first cell 31a and the second cell 31b.

Figure 8:
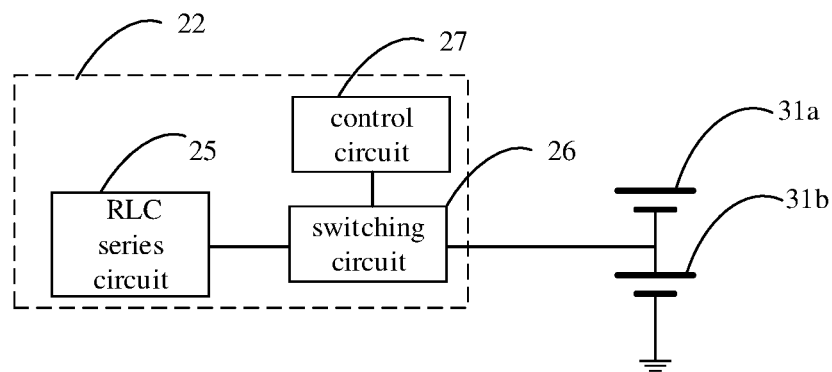
FIG. 8 is a schematic diagram of another connection relationship between an equalizing circuit and a cell according to an embodiment of the present disclosure.

The equalizing circuit in the embodiment of the present disclosure may be the equalizing circuit based on the RLC series circuit. As illustrated in FIG. 8, the equalizing circuit 22 may include an RLC series circuit 25, a switching circuit 26, and a control circuit 27. One end of the switching circuit 26 is coupled to the first cell 31a and the second cell 31b, and the other end of the switching circuit 26 is coupled to the RLC series circuit 25. A control end of the switching circuit 26 is coupled to the control circuit 27.

In the case that the voltages of the first cell 31a and the second cell 31b are not imbalanced, the control circuit 27 may control the switching circuit 26 such that the first cell 31a and the second cell 31b alternately forms the closed loop with the RLC series circuit 25 to supply the RLC series circuit 25 with the input voltage. In other words, the control circuit 27 may control the switching circuit 26 such that the first cell 31a and the second cell 31b alternately functions as a voltage source of the RLC series circuit 25, providing the RLC series circuit 25 with the input voltage.

Figure 9:
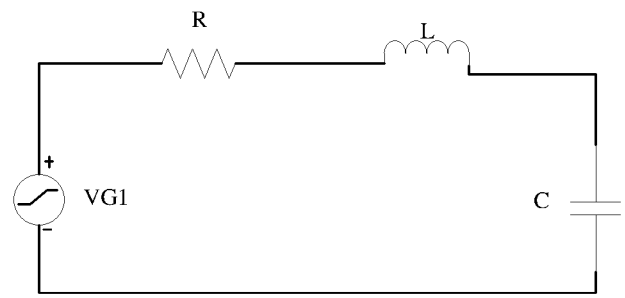
FIG. 9 is an equivalent circuit diagram of an RLC series circuit according to an embodiment of the present disclosure.
Figure 10:
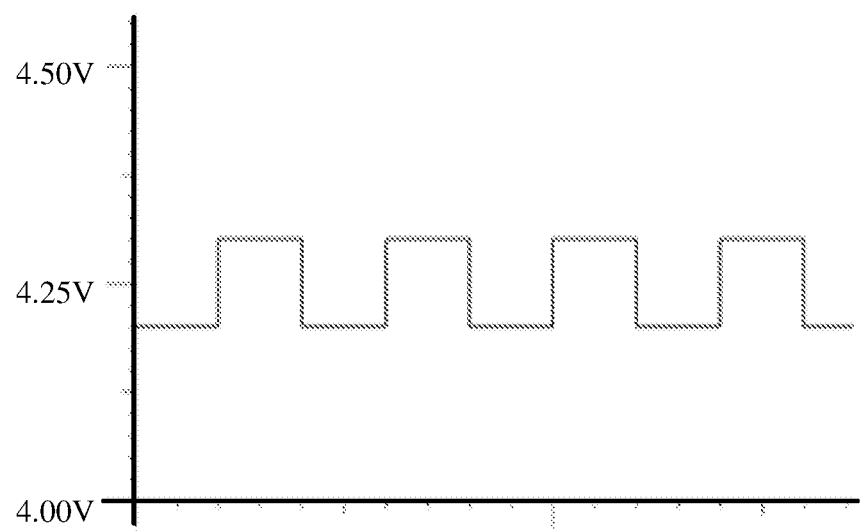
FIG. 10 is a waveform diagram of an input voltage of an RLC series circuit according to an embodiment of the present disclosure.

When the control circuit 27 alternately switches the first cell 31a and the second cell 31b into the RLC series circuit via the switching circuit 26, an equivalent circuit diagram as illustrated in FIG. 9 is obtained. In FIG. 9, VG1 represents an equivalent power supply of the RLC series circuit formed by the RLC series circuit 25 to which the first cell 31a and the second cell 31b are alternately coupled. Taking the voltage of the first cell 31a as 4.3V and the voltage of the second cell 31b as 4.2V as an example, a voltage waveform of VG1 is illustrated in FIG. 10, and the input voltage may be decomposed into a direct current component and an alternating current component of 4.25V, and a Vpp (a difference value between a lowest value and a highest value of the alternating current component) of the alternating current component is 0.5V.

Figure 11:
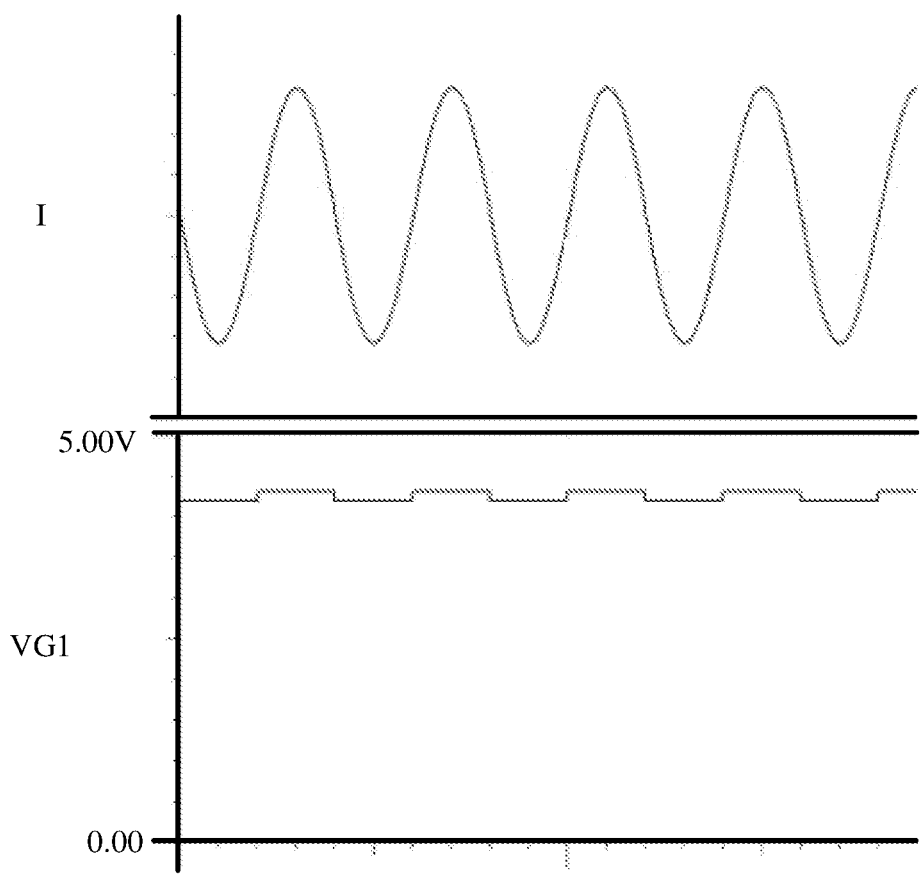
FIG. 11 is a comparison diagram of an input voltage waveform of an RLC series circuit and a current waveform of the RLC series circuit according to an embodiment of the present disclosure.

Still taking the voltage of the first cell 31a as 4.3V and the voltage of the second cell 31b as 4.2V as an example, FIG. 11 is a comparison graph of the waveform of the current I in the RLC series circuit 25 and the voltage waveform of VG 1. It should be understood that a value of I is related to an overall impedance of the RLC series circuit 25, which is not limited in the embodiment of the present disclosure.

When the voltage of VG1 is 4.3V, it indicates that the first cell 31a is coupled to the RLC series circuit 25; when the input voltage of VG1 is 4.2V, it indicates that the second cell 31a is coupled to the RLC series circuit. As may be seen from the comparison graph between the voltage waveform of VG1 and the waveform of the current I in the RLC series circuit 25 in FIG. 11, when the second cell 31b is coupled to the RLC series circuit 25, the current in the RLC series circuit 25 is negative, that is, the current flows into the second cell 31b from the outside, and charges the second cell 31b, so that the voltages of the first cell 31a and the second cell 31b may be equalized.

The equalizing circuit according to the embodiment of the present disclosure is the equalizing circuit based on the RLC series circuit, which has a characteristic of a simple circuit structure, and may reduce a complexity of the charging control apparatus. Further, the RLC series circuit has fewer components and lower total impedance, such that the equalizing circuit generates less heat during operation.

Note that, when the control circuit 27 alternately switches the first cell 31a and the second cell 31b into the RLC series circuit 25, the waveform of the current I in the RLC series circuit 25 is as illustrated in FIG. 11. When the impedance of the RLC series circuit 25 is too large, the amplitude of the current I is relatively small, and the process of equalizing the voltages of the first cell 31a and the second cell 31b is relatively slow.

The RLC series circuit 25 has a resonant characteristic, and the magnitude of the current I in the RLC series circuit 25 is related to the voltage frequency of VG1 (i.e., the frequency of the input voltage of the RLC series circuit 25). The closer the voltage frequency of VG1 is to a resonant frequency of the RLC series circuit 25, the larger the current in the RLC series circuit 25.

Therefore, in order to improve an efficiency of the energy transfer of the equalizing circuit, the control circuit 27 may control the switching circuit 26 such that the frequency of the input voltage of the RLC series circuit 25 approaches the resonant frequency of the RLC series circuit 25, which may significantly improve the efficiency of the energy transfer between the first cell 31a and the second cell 31b. When the frequency of the input voltage of the RLC series circuit 25 reaches the resonant frequency of the RLC series circuit 25 (i.e., the frequency of the input voltage of the RLC series circuit 25 reaches $f=\frac{1}{2\pi\sqrt{LC}}$ (L represents a self-inductance of the inductor L, and C represents a capacitance of the capacitor C)), the RLC series circuit 25 enters a resonant state. When the RLC series circuit is in the resonant state, the voltages on the inductor L and the capacitor C are equal and opposite in phase, and the two voltages cancel each other out, so that the inductor L and the capacitor C form the short circuit (the inductor L and the capacitor C are equivalent to one wire), the RLC series circuit 25 becomes a pure resistance circuit, the amplitude of the current I in the RLC series circuit 25 reaches a maximum, and the efficiency of the energy transfer of the equalizing circuit 22 reaches the maximum.

In the embodiment of the present disclosure, the form of the switching circuit 26 is not limited, as long as the first cell 31a and the second cell 31b may be alternately coupled to the RLC series circuit 25 by turning on and off the switching component in the switching circuit 26. Several alternative implementations of the switching circuit 26 are given below.

Figure 12:
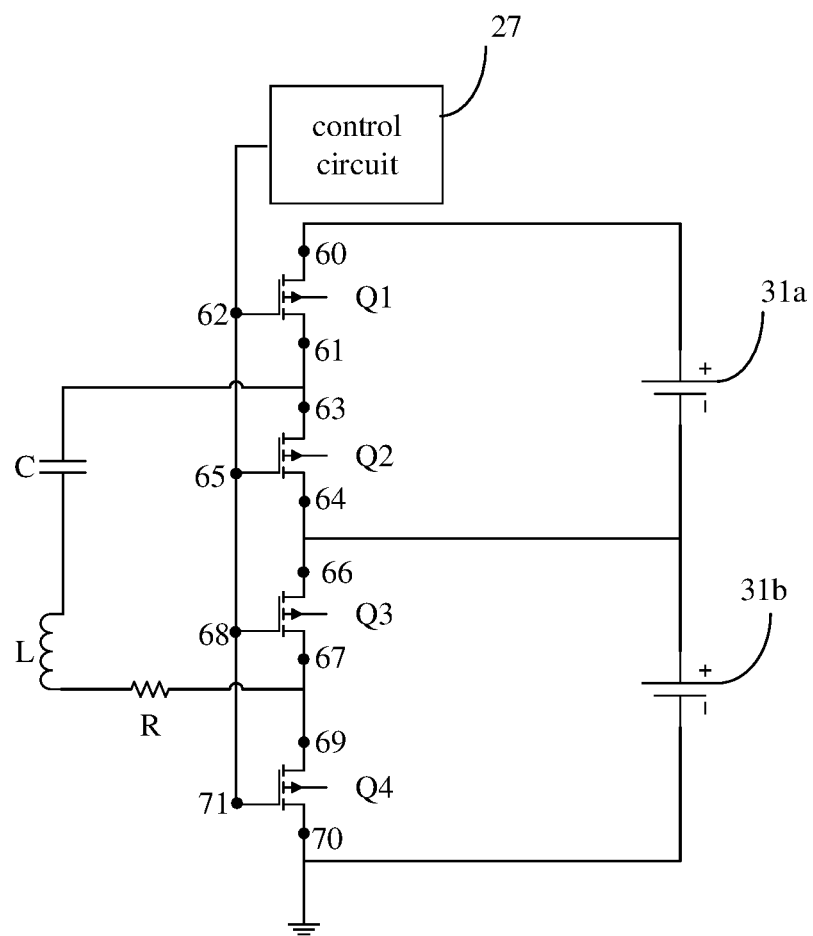
FIG. 12 is a schematic diagram of an alternative implementation of a switching circuit.

FIG. 12 illustrates an alternative implementation of the switching circuit. As illustrated in FIG. 12, the switching circuit may include a first switching tube Q1, a second switching tube Q2, a third switching tube Q3 and a fourth switching tube Q4. A first connection end 60 of the first switching tube Q1 is coupled to a positive pole of the first cell 31a. A second connection end 61 of the first switching tube Q1 is coupled to a first connection end 63 of the second switching tube Q2. A second connection end 64 of the second switching tube Q2 is coupled to a first connection end 66 of the third switching tube Q3 and a negative pole of the first cell 31a. A second connection end 67 of the third switching tube Q3 is coupled to a first connection end 69 of the fourth switching tube Q4. A second connection end 70 of the fourth switching tube Q4 is coupled to a negative pole of the second cell 31b. A positive pole of the second cell 31b is coupled to the negative pole of the first cell 31a. The control end 62 of the first switching tube Q1, the control end 65 of the second switching tube Q2, the control end 68 of the third switching tube Q3, and the control end 71 of the fourth switching tube Q4 are all coupled to the control circuit 27. Elements of the RLC series circuit (including the capacitor C, the inductor L and the resistor R illustrated in FIG. 6) are coupled in series between the second connection end 61 of the first switching tube Q1 and the second connection end 67 of the third switching tube Q3.

Figure 13:
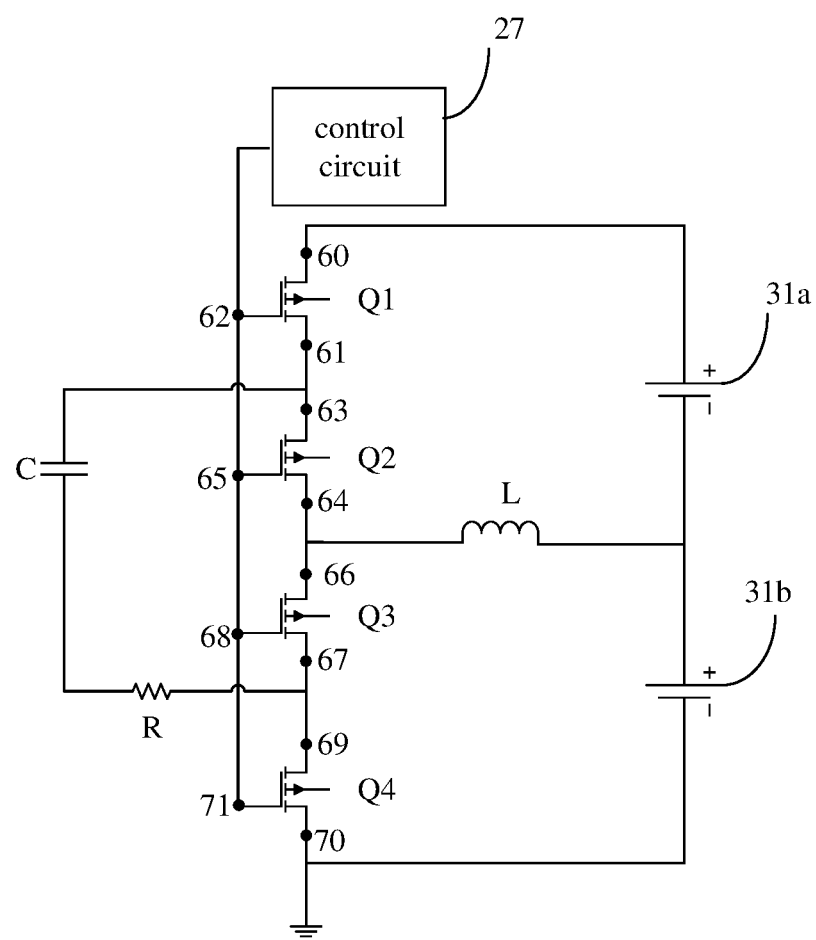
FIG. 13 is a schematic diagram of another alternative implementation of a switching circuit.

FIG. 13 illustrates another alternative implementation of the switching circuit. As illustrated in FIG. 13, the switching circuit may include the first switching tube Q1, the second switching tube Q2, the third switching tube Q3, and the fourth switching tube Q4. The first connection end 60 of the first switching tube Q1 is coupled to the positive pole of the first cell 31a. The second connection end 61 of the first switching tube Q1 is coupled to the first connection end 63 of the second switching tube Q2. The second connection end 64 of the second switching tube Q2 is coupled to the first connection end 66 of the third switching tube Q3. The second connection end 67 of the third switching tube Q3 is coupled to the first connection end 69 of the fourth switching tube Q4. The second connection end 70 of the fourth switching tube Q4 is coupled to the negative pole of the second cell 31b. The positive pole of the second cell 31b is coupled to the negative pole of the first cell 31a. The control end 62 of the first switching tube Q1, the control end 65 of the second switching tube Q2, the control end 68 of the third switching tube Q3, and the control end 71 of the fourth switching tube Q4 are all coupled to the control circuit 27. At least some elements of the RLC series circuit are coupled in series between the second connection end 64 of the second switching tube Q2 and the negative pole of the first cell 31a, and remaining elements of the RLC series circuit except the at least some elements are coupled in series between the second connection end 61 of the first switching tube Q1 and the second connection end 67 of the third switching tube Q3.

The at least some elements of the RLC series circuit described above may be any one or more of the inductor L, the capacitor C, and the resistor R. For example, the at least some elements of the RLC series circuit may be the inductor L, and the remaining elements of the RLC series circuit other than the at least some elements may be the capacitors C and the resistors R. As another example, the at least some elements of the RLC series circuit may be the inductor L and the capacitor C, and the remaining elements of the RLC series circuit other than the at least some elements may be the resistor R. For another example, the at least some elements of the RLC series circuit may be the resistor R, the capacitor C and the inductor L, and the remaining elements of the RLC series circuit except the at least some elements may be empty, in which case, the second connection end 61 of the first switch Q1 and the second connection end 67 of the third switch Q3 may be directly coupled by wire.

The switching tube may be, for example, a MOS tube. In addition, the connection end of the switching tube may refer to a source and/or a drain of the switching tube, and the control end of the switching tube may refer to a gate of the switching tube.

On the basis of the equalizing circuits described in FIGS. 12 and 13, an alternative control manner of the control circuit 27 is described below by taking FIGS. 14 and 15 as an example.

Figure 14:
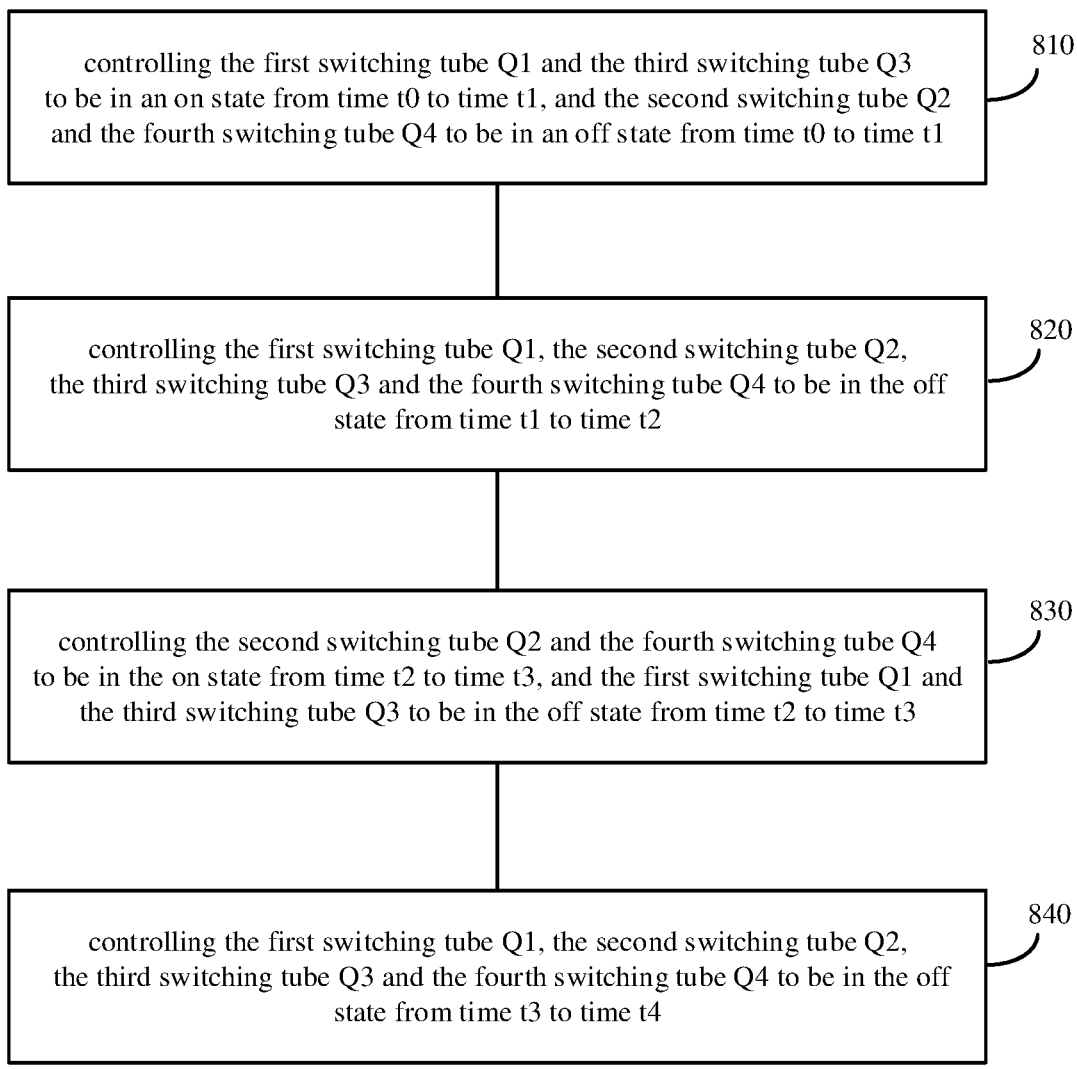
FIG. 14 is a flow chart of a control method according to an embodiment of the present disclosure.

FIG. 14 is a schematic flow chart of a control method according to an embodiment of the present disclosure. FIG. 14 is directed to the case that the voltage of the first cell 31a and the voltage of the second cell 31b are imbalanced, and the voltage of the first cell 31a is greater than the voltage of the second cell 31b. The control method of FIG. 14 includes acts in blocks 810 to 840, which will be described in detail below.

At block 810, the first switching tube Q1 and the third switching tube Q3 are controlled to be in an on state from time t0 to time t1, and the second switching tube Q2 and the fourth switching tube Q4 are controlled to be in an off state from time t0 to time t1. The time t0 is a starting time of an operating cycle of the control circuit 27 (i.e., the time 0 of the operating cycle). Referring to FIG. 12 or 13, it may be seen that when the first switching tube Q1 and the third switching tube Q3 are turned on and the second switching tube Q2 and the fourth switching tube Q4 are turned off, the first cell 31a, the capacitor C, the inductor L, and the resistor R form the closed loop, and the first cell 31a provides the input voltage for the RLC series circuit.

At block 820, the first switching tube Q1, the second switching tube Q2, the third switching tube Q3 and the fourth switching tube Q4 are controlled to be in the off state from time t1 to time t2. The period from time t1 to time t2 is a preset first dead period. The dead period may be understood as a protection period, which is to prevent the switching tubes Q1, Q3 and the switching tubes Q2, Q4 from turning-on at the same time, thereby causing a circuit failure.

At block 830, the second switching tube Q2 and the fourth switching tube Q4 are controlled to be in the on state from time t2 to time t3, and the first switching tube Q1 and the third switching tube Q3 are controlled to be in the off state from time t2 to time t 3. Referring to FIG. 12 or 13, it may be seen that when the second switching tube Q2 and the fourth switching tube Q4 are turned on and the first switching tube Q1 and the third switching tube Q3 are turned off, the second cell 31b, the capacitor C, the inductor L, and the resistor R form the closed loop, and the second cell 31b provides the input voltage for the RLC series circuit. In some embodiments, the value of t3−t2 may be equal to the value of t1−t0, that is, the on-time of the second switching tube Q2 and the fourth switching tube Q4 may be equal to the on-time of the first switching tube Q1 and the third switching tube Q3.

At block 840, the first switching tube Q1, the second switching tube Q2, the third switching tube Q3 and the fourth switching tube Q4 are controlled to be in the off state from time t3 to time t4. Time t4 is an end time of the operating cycle. The period from time t3 to time t4 is a preset second dead period. In some embodiments, the second dead period may be equal to the first dead period. Further, in some embodiments, by properly setting the value of t1-t4, an operating frequency of the control circuit 27 may be made equal to the resonant frequency of the RLC series circuit, which may make the frequency of the input voltage of the RLC series circuit equal to the resonant frequency of the RLC series circuit, thereby causing the RLC series circuit to reach the resonant state.

It should be understood that FIG. 14 illustrates a control timing of the control circuit 27 in any operation cycle. The control timing of other operation cycles is similar, which will not be described in detail.

Figure 15:
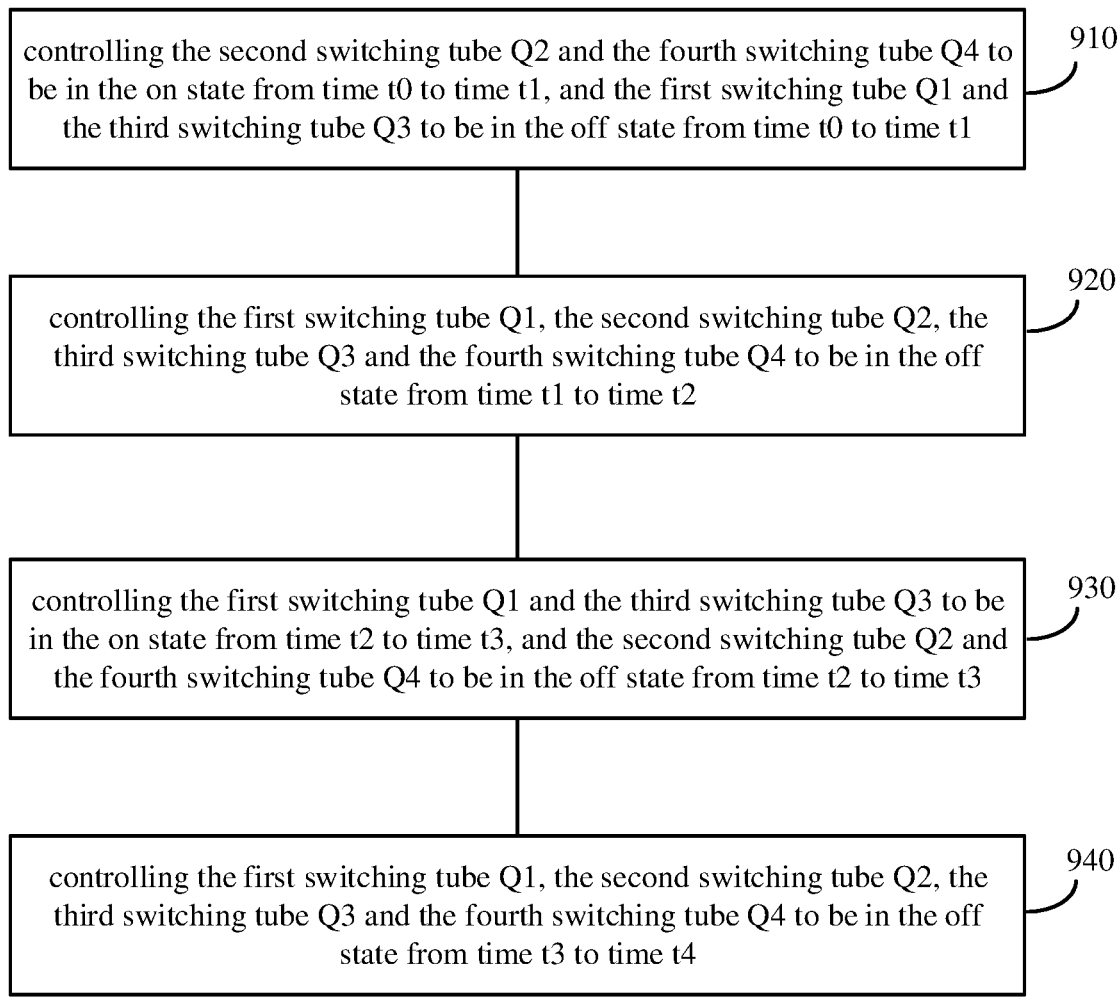
FIG. 15 is a flow chart of a control method according to another embodiment of the present disclosure.

FIG. 15 is a schematic flow chart of a control method according to another embodiment of the present disclosure. FIG. 15 is directed to the case that the voltage of the first cell 31a and the voltage of the second cell 31b are imbalanced, and the voltage of the second cell 31b is greater than the voltage of the first cell 31a. The control method described in FIG. 15 is similar to the control method described in FIG. 14, except that an on-off sequence of the first switching tube Q1 and the third switching tube Q3 is exchanged with the on-off sequence of the second switching tube Q2 and the fourth switching tube Q4. The control method of FIG. 15 includes acts at blocks 910-940, which are described in detail below.

At block 910, the second switching tube Q2 and the fourth switching tube Q4 are controlled to be in the on state from time t0 to time t1, and the first switching tube Q1 and the third switching tube Q3 are controlled to be in the off state from time t0 to time t1. Time t0 is the starting time of the operating cycle of the control circuit 27. Referring to FIG. 12 or 13, it may be seen that when the second switching tube Q2 and the fourth switching tube Q4 are turned on and the first switching tube Q1 and the third switching tube Q3 are turned off, the second cell 31b, the capacitor C, the inductor L, and the resistor R form the closed loop, and the second cell 31b provides the input voltage for the RLC series circuit.

At block 920, the first switching tube Q1, the second switching tube Q2, the third switching tube Q3 and the fourth switching tube Q4 are controlled to be in the off state from time t1 to time t2. The period between time t1 and time t2 is the preset first dead period.

At block 930, the first switching tube Q1 and the third switching tube Q3 are controlled to be in the on state from time t2 to time t3, and the second switching tube Q2 and the fourth switching tube Q4 are controlled to be in the off state from time t2 to time t3. Referring to FIG. 12 or 13, it may be seen that when the first switching tube Q1 and the third switching tube Q3 are turned on and the second switching tube Q2 and the fourth switching tube Q4 are turned off, the first cell 31a, the capacitor C, the inductor L, and the resistor R form the closed loop, and the first cell 31a provides the input voltage for the RLC series circuit.

In some embodiments, the value of t3–t2 may be equal to the value of t1–t0, that is, the on-time of the second switching tube Q2 and the fourth switching tube Q4 may be equal to the on-time of the first switching tube Q1 and the third switching tube Q3.

At block 940, the first switching tube Q1, the second switching tube Q2, the third switching tube Q3 and the fourth switching tube Q4 are controlled to be in the off state from time t3 to time t4. Time t4 is the end time of the operating cycle. The period from time t3 to time t4 is the preset second dead period. In some embodiments, the second dead period may be equal to the first dead period. Further, in some embodiments, by properly setting the value of t1-t4, the operating frequency of the control circuit 27 may be made equal to the resonant frequency of the RLC series circuit, which may make the frequency of the input voltage of the RLC series circuit equal to the resonant frequency of the RLC series circuit, thereby causing the RLC series circuit to reach the resonant state.

It should be understood that FIG. 15 illustrates the control timing of the control circuit 27 in any operation cycle. The control timing of other operation cycles is similar, which will not be described in detail.

Optionally, the equalizing circuit mentioned in the embodiment of the present disclosure may also use a parallel-resistor manner to perform the voltage equalization on the plurality of cells, in addition to the Cuk circuit, the equalizing circuit based on the RLC series circuit, or the equalizing circuit based on the Buck-Boost described above.

For example, a resistor may be coupled in parallel to each cell in the plurality of cells, and a switch may be disposed on a parallel loop. The parallel resistor may be operated and stopped by turning on and off the switch. When the voltage of a certain cell in the plurality of cells is relatively high, the switch on the parallel loop may be closed, and the resistor coupled with the cell in parallel is started to operate. After the switch is closed, a part of electric quantity on the cell flows to the resistor and is dissipated by the resistor by means of the heat energy, so that the voltage on the cell is reduced. Therefore, the part of the relatively-high voltage on the cell may be consumed by means of the parallel resistor, so that the voltage of the cell is equalized with the voltages of other cells.

The voltages of the plurality of cells may be equalized by means of connecting the resistors in parallel. The operation is simple and easy to realize, and an accurate equalization of the voltages of the plurality of cells may be realized.

The voltages of the plurality of cells may be equalized in a parallel-resistor mode, which may be suitable for a scenario with small voltage differences among the plurality of cells. For example, it may be applied to a process of charging the plurality of cells using the first charging channel, where the voltages of the plurality of cells may be inconsistent. At this time, the resistor coupled in parallel with the cell with a higher voltage may be started to operate, and redundant electricity is dissipated through the resistor, so that the voltage of the cell after equalization is consistent with the voltage of the cell with a lower voltage or the lowest voltage in the plurality of cells. For another example, it may also be applied to the scenario where the voltages of the plurality of cells are not imbalanced after the battery 30 is charged. In this case, the charging channel used for charging the battery 30 is not limited, and the battery 30 may be charged using the first charging channel, or the battery 30 may be charged using the second charging channel. During the process of charging the battery 30 by using the second charging channel, the equalizing circuit described above may be used to equalize the voltages in the plurality of cells, and after the charging is finished, if there is an imbalance among the voltages in the plurality of cells, the voltage equalization may be implemented by using the parallel resistors. As another example, it may also be applied to the process in which the battery 30 supplies power to the system. During the process of supplying power to the system by the battery 30, the voltages of the plurality of cells may be not imbalanced, and at this time, the resistor coupled in parallel with the cell with the higher voltage may also be started to operate, so as to achieve the voltage equalization of the plurality of cells.

Optionally, the operating period of the parallel resistor may be controlled by the control circuit in the embodiment of the present disclosure. The control circuit may control the operating period of the parallel resistor according to the current electric quantities and/or the current voltages of the cells. For example, there are the difference values between the voltages of the remaining cells in the plurality of cells and the voltage of the cell with the lowest voltage, and the control circuit may control the operation of the parallel resistors according to the magnitude of the difference values. When the voltage difference value between the voltage of a certain cell and the voltage of the cell with the lowest voltage is large, the operating period of the resistor coupled in parallel on the cell may be controlled to be longer. When the voltage difference value between the voltage of the certain cell and the voltage of the cell with the lowest voltage is smaller, the operating period of the resistor coupled in parallel to the cell may be controlled to be shorter.

Figure 16:
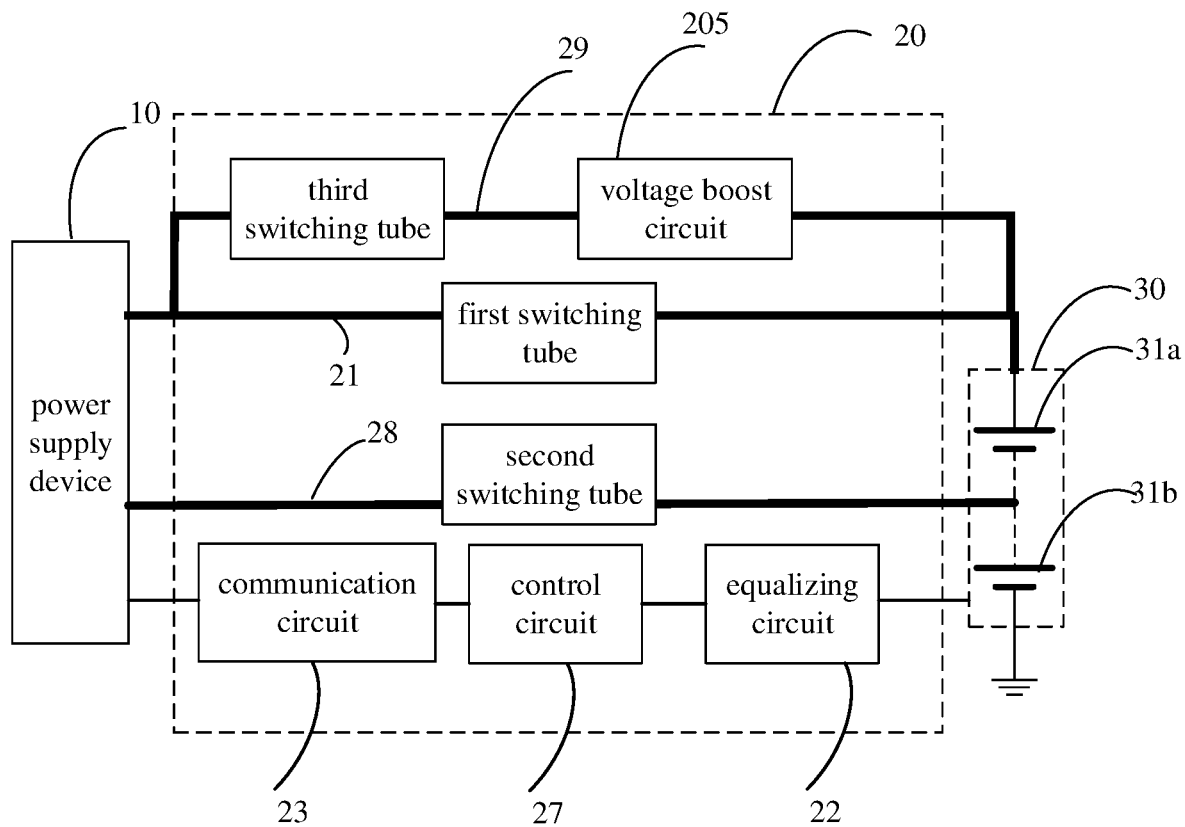
FIG. 16 is a schematic block diagram of a charging system according to still another embodiment of the present disclosure.

Optionally, in some embodiments, as illustrated in FIG. 16, the charging control apparatus 20 may further include a third charging channel 29. A voltage boost circuit 205 is disposed on the third charging channel 29. During the process of charging the battery 30 by the power supply device 10 through the third charging channel 29, the voltage boost circuit 205 is configured to receive an initial voltage provided by the power supply device 10, boost the initial voltage to a target voltage, and charge the battery 30 based on the target voltage, in which the initial voltage is smaller than a total voltage of the battery 30, and the target voltage is greater than the total voltage of the battery 30; the control circuit 27 may also be configured to control a switching among the first charging channel 21, the second charging channel 28, and the third charging channel 29.

As indicated above, the first charging channel and the second charging channel may be direct charging channels, and the power supply device is the power supply device with the adjustable output voltage. In this charging manner, the charging voltage provided by the first-type power supply device is required to be higher than the total voltage of the plurality of cells coupled in series in the battery, and the charging voltage provided by the second-type power supply device is required to be higher than the total voltage of the part of the plurality of cells. For example, for the solution in which two cells are coupled in series, assuming that the current voltage of each cell is 4V, when the two cells are charged using the first charging channel 21, the charging voltage provided by the first-type power supply device 10 is at least required to be greater than 8V. However, the output voltage of an ordinary power supply device generally cannot reach 8V (taking an ordinary adapter as an example, the output voltage of which is generally 5V), so that the ordinary power supply device cannot charge the battery 30 through the first charging channel 21. In order to be compatible with the ordinary power supply device (such as an ordinary power adapter), the third charging channel 29 is introduced in the embodiment of the present disclosure, and the third charging channel 29 is provided with the voltage boosting circuit 205, so that the voltage boosting circuit 205 may boost the initial voltage provided by the power supply device 10 to the target voltage, and the target voltage is greater than the total voltage of the battery 30, thereby solving the problem that the ordinary adapter cannot charge the battery 30 with the plurality of cells of the series structure according to the embodiment of the present disclosure.

The embodiment of the present disclosure does not limit the form of the voltage boost circuit 205. For example, a Boost circuit may be used, and a charge pump may be used for boosting. Optionally, in some embodiments, the third charging channel 29 may adopt a conventional charging channel design, i.e., the conversion circuit (e.g., a charging IC) is disposed on the third charging channel 29. The conversion circuit may perform a constant-voltage and constant-current control on the charging process of the battery 30, and adjust the initial voltage provided by the power supply device 10 according to actual needs, such as the boosting or the bucking. The embodiment of the present disclosure may utilize the boosting function of the conversion circuit to boost the initial voltage provided by the power supply device 10 to the target voltage.

The control circuit 27 may implement the switching among the first charging channel 21, the second charging channel 28, and the third charging channel 29 by the switching device. In detail, as illustrated in FIG. 16, the third switching tube may be disposed on the third charging channel 29. The control circuit may control the first switching tube and the second switching tube to be turned off and control the third switching tube to be turned on, such that the third charging channel 29 operates, and the power supply device 10 may charge the battery 30 by adopting the third charging channel 29.

Figure 17:
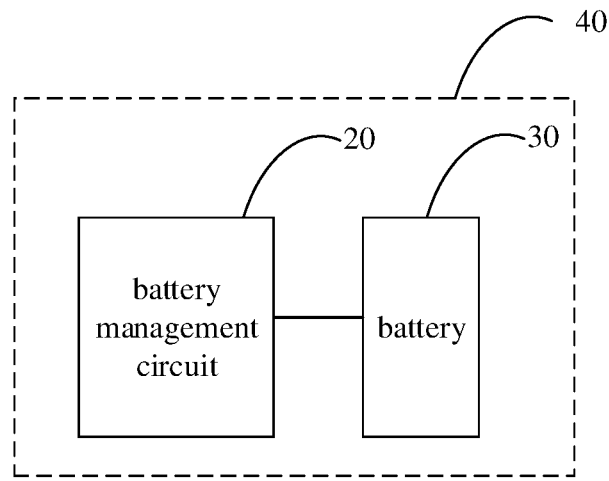
FIG. 17 is a schematic block diagram of a device to be charged according to an embodiment of the present disclosure.

The embodiment of the present disclosure further provides the device to be charged. As illustrated in FIG. 17, the device 40 to be charged may include the charging control apparatus 20 and the battery 30 described above.

At present, the system of the device (such as a terminal) to be charged generally adopts the single cell to supply power. The plurality of cells coupled in series are introduced in the embodiment of the present disclosure. The total voltage of the plurality of cells is high, so that it is not suitable to supply power directly to the system of the device to be charged. In order to solve the problem, a feasible implementation is to adjust the operating voltage of the device to be charged system so that the system of the device to be charged may support a simultaneous power supply of the plurality of cells, but the implementation has a large alteration on the device to be charged and a high cost.

Optionally, in some embodiments, the voltage step-down circuit may be added to the power supply circuit of the device 40 to be charged, so that the reduced voltage meets the requirement of the device 40 to be charged for the power supply voltage.

Taking a range of the operating voltage of the single cell being 3.0V-4.35V as an example, in order to ensure that the power supply voltage of the system of the device to be charged is normal, the voltage step-down circuit may reduce the total voltage of the battery 30 to any value within the range of 3.0V-4.35V. The voltage step-down circuit may be implemented in various ways, for example, the voltage step-down may be implemented in the form of the Buck circuit, the charge pump, or other circuits.

Optionally, in other embodiments, the input end of the power supply circuit of the device 40 to be charged may be coupled to both ends of any single cell in the battery 30. The power supply circuit may supply power to the system of the device 40 to be charged based on the voltage of the single cell.

It should be understood that ripples may appear in the voltage that is reduced by the voltage step-down circuit, thereby affecting the power supply quality of the device to be charged. The embodiment of the present disclosure still utilizes the single cell to supply power for the system in the device to be charged, because the voltage output by the single cell is relatively stable. The embodiment of the present disclosure may guarantee the power supply quality of the system of the device to be charged while solving the problem of how to supply power under the solution of the plurality of cells.

When the single cell is adopted for the power supply, the voltage imbalance among different cells in the battery 30 may occur. The voltage imbalance may cause a difficulty in the battery management, and the inconsistency of cell parameters inside the battery may cause the reduction in the service life of the battery. In the embodiment of the present disclosure, the Cuk circuit may be used to perform the voltage equalization on the cells, so that the voltage balance among the cells in the battery 30 may still be maintained on the basis of the single-cell power supply solution.

Along with a growth of an output power of the power supply device, when the power supply device charges the cell in the device to be charged, it may cause easily a lithium plating phenomenon to reduce the service life of the cell.

In order to improve a reliability and a safety of the cell, in some embodiments, the power supply device 10 may be controlled to output the pulsating direct current (or called an unidirectional pulsating output current, or called a current of the pulsating waveform, or called a steamed-bread-wave current). Since the first charging channel 21 charges the battery 30 in a direct charging manner, the pulsating direct current provided by the power supply device 10 may be directly applied to two ends of the battery 30. As illustrated in FIG. 18, the magnitude of the pulsating direct current changes periodically. Compared with the constant direct current, the pulsating direct current may reduce the lithium plating phenomenon of the cell and prolong the service life of the cell. In addition, compared with the constant direct current, the pulsating direct current may reduce a probability and a strength of an arc discharge of a contact of a charging interface, and the service life of the charging interface is prolonged.

There are various ways to adjust the charging current output by the power supply device 10 to be the pulsating direct current, for example, a primary filter circuit and a secondary filter circuit in the power supply device 10 may be removed, so that the power supply device 10 outputs the pulsating direct current.

Optionally, in some embodiments, the charging current provided by the power supply device 10 and received by the first charging channel 21 may also be the alternating current (for example, the primary filter circuit, the secondary rectifier circuit, and the secondary filter circuit of the power supply device 10 may be removed, so that the power supply device 10 outputs the alternating current), and the alternating current may also reduce the lithium plating phenomenon of the lithium cell, and improve the service life of the cell.

Optionally, in some embodiments, the power supply device 10 may support the first charging mode, the second charging mode, and the third charging mode, in which the power supply device 10 charges the battery 30 in the third charging mode faster than the power supply device 10 charges the battery 30 in the second charging mode, and the power supply device 10 charges the battery 30 in the second charging mode faster than the power supply device 10 charges the battery 30 in the first charging mode. In other words, the power supply device operating in the second charging mode takes less time to fully charge the same capacity battery than the power supply device operating in the first charging mode, and the power supply device operating in the third charging mode takes less time to fully charge the same capacity battery than the power supply device operating in the second charging mode. Further, in some embodiments, in the first charging mode, the power supply device charges the battery 30 through the third charging channel 29. In the second charging mode, the power supply device charges the battery 30 through the second charging channel 28. In the third charging mode, the power supply device charges the battery 30 through the first charging channel 21.

The first charging mode may be a normal charging mode, and the second charging mode and the third charging mode may be fast charging modes. The normal charging mode is that the power supply device outputs a relatively-small current (usually less than 2.5 A) or charges the battery in the device to be charged with a relatively-small power (usually less than 15 W). It usually takes several hours to fully charge a large-capacity battery (for example, a battery with a capacity of 3000 mAh) in the normal charging mode. In the fast charging mode, the power supply device may output a relatively-large current (usually greater than 2.5 A, such as 4.5 A, 5 A or even higher) or charge the battery in the device with a relatively-large power (usually greater than or equal to 15 W). Compared to the normal charging mode, the charging period required by the power supply device to fully charge the battery with the same capacity in the fast charging mode may be significantly shortened and the charging speed is faster.

Taking the battery 30 including the cell 31*a* and the cell 13*b* as an example, the first charging channel may charge the cell 31*a* and the cell 13*b*, and the second charging channel may charge the cell 31*b*. The charging speed of the first charging channel may be about 2 times that of the second charging channel.

Further, the communication circuit 23 may perform a bidirectional communication with the power supply device 10 to control the output of the power supply device 10 in the second charging mode and/or the third charging mode (i.e., to control the charging voltage and/or the charging current provided by the power supply device 10 in the second charging mode and/or the third charging mode). The device 40 to be charged may include a charging interface. The communication circuit 23 may communicate with the power supply device 10 through a data line in the charging interface. Taking the charging interface being a USB interface as an example, the data line may be a D+ line and/or a D− line in the USB interface. Alternatively, the device 40 to be charged may also perform wireless communication with the power supply device 10.

The embodiment of the present disclosure does not limit a communication content between the power supply device 10 and the communication circuit 23, and a manner in which the communication circuit 23 controls the output of the power supply device 10 in the second charging mode and/or the third charging mode. For example, the communication circuit 23 may communicate with the power supply device 10, interact the current total voltage and/or the current total electric quantity of the battery 30 in the device to be charged, and adjust the output voltage or the output current of the power supply device 10 based on the current total voltage and/or the current total electric quantity of the battery 30. The communication content between the communication circuit 23 and the power supply device 10, and the manner in which the communication circuit 23 controls the output of the power supply device 10 in the second charging mode are described in detail below with reference to embodiments.

The above description of the embodiment of the present disclosure does not limit a master-slave relation of the power supply device 10 and the device to be charged (or the communication circuit 23 in the device to be charged). In other words, any one of the power supply device 10 and the device to be charged may initiate a two-way communication session as a master side, and accordingly, the other side may make a first response or a first reply to the communication initiated by the master side as a slave side. As a possible implementation, the identities of the master side and slave side may be confirmed by comparing levels of the power supply device 10 and the device to be charged with respect to the ground during communication.

The embodiment of the present disclosure does not limit an implementation of the bidirectional communication between the power supply device 10 and the device to be charged. That is, any one of the power supply device 10 and the device to be charged initiates the communication session as the master side, and correspondingly, the other one of the power supply device 10 and the device to be charged initiates the first response or the first reply to the communication session initiated by the master side as the slave side, and meanwhile, the master side may make a second response to the first response or the first reply of the slave side. That is, it is considered that a negotiation process of the charging mode between the master side and the slave side is completed. As a possible implementation, after the negotiation of the charging mode is completed for plurality of times, the master side and the slave side may perform the charging operation between the master side and the slave side, so as to ensure that the charging process after the negotiation is performed safely and reliably.

One way in which the master side may make the second response according to the first response or the first reply of the slave side to the communication session, may be that: the master side may receive the first response or the first reply made by the slave side for the communication session, and make the second response according to the received first response or first reply of the slave side. For example, when the master side receives the first response or the first reply to the communication session from the slave side within a preset period of time, the act that the master side makes the second response to the first response or the first reply from the slave side is that: the master side and the slave side complete the negotiation of the charging mode, and the master side and the slave side perform the charging operation in the first charging mode or the third charging mode according to a negotiation result and, that is, the power supply device 10 operates in the first charging mode or the third charging mode according to the negotiation result to charge the device to be charged.

One way in which the master side may make the further second response according to the first response or the first reply of the slave side to the communication session may be that: the master side does not receive the first response or the first reply made by the slave side for the communication session within the preset period of time, and the master side also makes the second response for the first response or the first reply from the slave side. For example, when the master side does not receive the first response or the first reply to the communication session from the slave side within the preset period of time, the act that the master side also makes the second response to the first response or the first reply from the slave side is as follows: the master side and the slave side complete the negotiation of the charging mode, and the master side and the slave side perform the charging operation according to the first charging mode, that is, the power supply device 10 operates in the first charging mode to charge the device to be charged.

Optionally, in some embodiments, when the device to be charged initiates the communication session as the master side, and after the power supply device 10 as the slave side makes the first response or the first reply to the communication session initiated by the master side, it is unnecessary for the device to be charged to make the second response to the first response or the first reply of the power supply device 10, that is, it may be considered that the negotiation process of the charging mode is completed between the power supply device 10 and the device to be charged. The power supply device 10 may determine to charge the device to be charged in the first charging mode or the third charging mode according to the negotiation result.

Optionally, in some embodiments, the communication circuit 23 performing the bidirectional communication with the power supply device 10 to control an outputting process of the power supply device 10 in the third charging mode includes following. The communication circuit 23 performs the bidirectional communication with the power supply device 10 to negotiate the charging mode between the power supply device 10 and the device to be charged.

Optionally, in some embodiments, the communication circuit 23 performs the bidirectional communication with the power supply device 10 to negotiate the charging mode between the power supply device 10 and the device to be charged, which includes the following. The communication circuit 23 receives a first instruction transmitted by the power supply device 10, in which the first instruction is configured to inquire whether the device to be charged starts the third charging mode; the communication circuit 23 transmits a reply instruction of the first instruction to the power supply device 10, in which the reply instruction of the first instruction is configured to indicate whether the device to be charged agrees to turn on the third charging mode; In the case that the device to be charged agrees to turn on the third charging mode, the communication circuit 23 controls the power supply device 10 to charge the battery 30 through the first charging channel 21.

Optionally, in some embodiments, the communication circuit 23 performing the bidirectional communication with the power supply device 10 to control an outputting process of the power supply device 10 in the third charging mode includes the following. The communication circuit 23 performs the bidirectional communication with the power supply device 10 to determine the charging voltage for charging the device to be charged, which is output by the power supply device 10 in the third charging mode.

Optionally, in some embodiments, the communication circuit 23 performs the bidirectional communication with the power supply device 10 to determine the charging voltage output by the power supply device 10 in the third charging mode for charging the device to be charged, which includes the following. The communication circuit 23 receives a second instruction transmitted by the power supply device 10, in which the second instruction is configured to inquire whether the output voltage of the power supply device 10 matches the current total voltage of the battery 30 of the device to be charged; the communication circuit 23 transmits the reply instruction of the second instruction to the power supply device 10, in which the reply instruction of the second instruction is configured to indicate that the output voltage of the power supply device 10 matches, or be higher than or be lower than the current total voltage of the battery 30. Alternatively, the second instruction may be configured to inquire whether the current output voltage of the power supply device 10 is appropriate as the charging voltage for charging the device to be charged, which is output by the power supply device 10 in the third charging mode, and the reply instruction of the second instruction may be configured to indicate that the output voltage of the current power supply device 10 is appropriate, higher, or lower. The current output voltage of the power supply device 10 matches the current total voltage of the battery, or the current output voltage of the power supply device 10 is suitable as the charging voltage output by the power supply device 10 in the third charging mode for charging the device to be charged, which means that the current output voltage of the power supply device 10 is slightly higher than the current total voltage of the battery, and the difference value between the output voltage of the power supply device 10 and the current total voltage of the battery is within a preset range (typically in the magnitude of several hundred millivolts).

Optionally, in some embodiments, the communication circuit 23 performing the bidirectional communication with the power supply device 10 to control an outputting process of the power supply device 10 in the third charging mode includes the following. The communication circuit 23 performs the bidirectional communication with the power supply device 10 to determine the charging current that is output by the power supply device 10 in the third charging mode for charging the device to be charged.

Optionally, in some embodiments, the communication circuit 23 performs the bidirectional communication with the power supply device 10 to determine the charging current output by the power supply device 10 in the third charging mode for charging the device to be charged, which may include the following. The communication circuit 23 receives a third instruction transmitted by the power supply device 10, in which the third instruction is configured to inquire a maximum charging current currently supported by the device to be charged; the communication circuit 23 transmits the reply instruction of the third instruction to the power supply device 10, in which the reply instruction of the third instruction is configured to indicate the maximum charging current currently supported by the device to be charged, so that the power supply device 10 determines, based on the maximum charging current currently supported by the device to be charged, the charging current that is output by the power supply device 10 in the third charging mode and used for charging the device to be charged. It should be understood that there are various ways for the power supply device 10 to determine the charging current output by the power supply device 10 in the third charging mode for charging the device to be charged according to the maximum charging current currently supported by the device to be charged. For example, the power supply device 10 may determine the maximum charging current currently supported by the device to be charged as the charging current output by the power supply device 10 in the third charging mode for charging the device to be charged, or may determine the charging current output by the power supply device 10 in the third charging mode for charging the device to be charged after comprehensively considering the maximum charging current currently supported by the device to be charged, the current output capability of the power supply device, and other factors.

Optionally, in some embodiments, the communication circuit 23 performing the bidirectional communication with the power supply device 10 to control an outputting process of the power supply device 10 in the third charging mode includes the following. During the charging using the third charging mode, the communication circuit 23 performs the bidirectional communication with the power supply device 10 to adjust the output current of the power supply device 10.

In detail, the communication circuit 23 performs the bidirectional communication with the power supply device 10 to adjust the output current of the power supply device 10, which may include the following. The communication circuit 23 receives a fourth instruction transmitted by the power supply device 10, in which the fourth instruction is configured to inquire the current total voltage of the battery; the communication circuit 23 transmits the reply instruction of the fourth instruction to the power supply device 10, in which the reply instruction of the fourth instruction is configured to indicate the current total voltage of the battery, so that the power supply device 10 adjusts the output current of the power supply device 10 according to the current total voltage of the battery.

Optionally, in some embodiments, the communication circuit 23 performing the bidirectional communication with the power supply device 10 to control an outputting process of the power supply device 10 in the third charging mode includes the following. The communication circuit 23 performs the bidirectional communication with the power supply device 10 to determine whether the charging interface is in a poor contact.

In detail, the communication circuit 23 performs the bidirectional communication with the power supply device 10 to determine whether the charging interface is in the poor contact, which may include the following. The communication circuit 23 receives the fourth instruction transmitted by the power supply device 10, in which the fourth instruction is configured to inquire the current voltage of the battery of the device to be charged; the communication circuit 23 transmits the reply instruction of the fourth instruction to the power supply device 10, in which the reply instruction of the fourth instruction is configured to indicate the current voltage of the battery of the device to be charged, so that the power supply device 10 determines whether the charging interface is in the poor contact or not according to the output voltage of the power supply device 10 and the current voltage of the battery of the device to be charged. For example, if the power supply device 10 determines that the voltage difference value between the output voltage of the power supply device 10 and the current voltage of the device to be charged is greater than a preset voltage threshold, it indicates that the impedance obtained by dividing the voltage difference by the current value output by the power supply device 10 at this time is greater than a preset impedance threshold, and it may be determined that the charging interface is in the poor contact.

Optionally, in some embodiments, the poor contact of the charging interface may also be determined by the device to be charged. For example, the communication circuit 23 transmits a sixth instruction for inquiring the output voltage of the power supply device 10, to the power supply device 10; the communication circuit 23 receives a reply instruction of the sixth instruction from the power supply device 10, in which the reply instruction of the sixth instruction is configured to indicate the output voltage of the power supply device 10; the communication circuit 23 determines whether the charging interface is in the poor contact or not, based on the current voltage of the battery and the output voltage of the power supply device 10. After the communication circuit 23 determines that the charging interface is in the poor contact, the communication circuit 23 may transmit a fifth instruction to the power supply device 10, in which the fifth instruction is configured to indicate that the charging interface is in the poor contact. The power supply device 10 may exit the third charging mode after receiving the fifth instruction.

Similarly, the communication circuit 23 may also perform the bidirectional communication with the power supply device 10 to determine whether to turn on the second communication mode. For the communication process, reference may be made to the above description, and details are not described herein for brevity.

The communication process between the power supply device 10 and the device 40 to be charged (which may be the communication circuit 23 in the device 40 to be charged) is described in more detail below with reference to FIG. 19. It should be noted that an example of FIG. 19 is for assisting those skilled in the art to understand the embodiments of the present disclosure, and the embodiments of the present disclosure are not limited to the values or the scenarios illustrated. It will be apparent to those skilled in the art that various equivalent modifications or variations are possible in light of the example given in FIG. 19, and such modifications or variations are intended to fall within the scope of the embodiments of the present disclosure.

As illustrated in FIG. 19, a communication flow between the power supply device 10 and the device 40 to be charged (or the communication flow of a fast process) may include the following five stages.

At stage 1, after the device 40 to be charged is coupled to the power supply device 10, the device 40 to be charged may detect the type of the power supply device 10 through the data lines D+, D−. When it is detected that the power supply device 10 is the power supply device dedicated for charging, such as the adapter, the current absorbed by the device 40 to be charged may be greater than a preset current threshold 12 (which may be 1 A, for example). When the power supply device 10 detects that the output current of the power supply device 10 is greater than or equal to 12 within a preset period of time (which may be, for example, a continuous period T1), the power supply device 10 may consider that the device 40 to be charged has completed the recognition of the type of the power supply device. Next, the power supply device 10 starts the negotiation process with the device 40 to be charged, and transmits an instruction 1 (corresponding to the first instruction described above) to the device 40 to be charged to inquire whether the device 40 to be charged agrees with the power supply device 10 to charge the device 40 to be charged in the third charging mode.

When the power supply device 10 receives the reply instruction of the instruction 1 from the device 40 to be charged, and the reply instruction of the instruction 1 indicates that the device 40 to be charged does not agree with the power supply device 10 to charge the device 40 to be charged in the third charging mode, the power supply device 10 detects the output current of the power supply device 10 again. When the output current of the power supply device 10 is still greater than or equal to 12 within a preset period of time (which may be, for example, the continuous period of T1), the power supply device 10 again transmits the instruction 1 to the device 40 to be charged, asking whether the device 40 to be charged agrees to charge the device 40 to be charged by the power supply device 10 in the third charging mode. The power supply device 10 repeats the above acts of stage 1 until the device 40 to be charged agrees that the power supply device 10 charges the device 40 to be charged in the third charging mode, or the output current of the power supply device 10 is no longer greater than or equal to 12.

When the device 40 to be charged agrees that the power supply device 10 charges the device 40 to be charged in the third charging mode, the communication flow proceeds to stage 2.

At stage 2, for the output voltage of the power supply device 10, there may be a plurality of levels. The power supply device 10 transmits an instruction 2 (corresponding to the second instruction described above) to the device 40 to be charged to inquire whether the output voltage (current output voltage) of the power supply device 10 matches the current voltage of the battery 30 in the device 40 to be charged.

The device 40 to be charged transmits the reply instruction of the instruction 2 to the power supply device 10 to indicate that the output voltage of the power supply device 10 matches, or is higher than, or is lower than the current voltage of the battery of the device 40 to be charged. If the reply instruction of the instruction 2 indicates that the output voltage of the power supply device 10 is higher or lower, the power supply device 10 may adjust the output voltage of the power supply device 10 by one level, and transmit the instruction 2 to the device 40 to be charged again, asking again whether the output voltage of the power supply device 10 matches the current voltage of the battery. The above acts of stage 2 are repeated until the device 40 to be charged determines that the output voltage of the power supply device 10 matches the current voltage of the battery of the device 40 to be charged, and stage 3 is entered.

At stage 3, the power supply device 10 transmits an instruction 3 (corresponding to the third instruction described above) to the device 40 to be charged, inquiring the maximum charging current currently supported by the device 40 to be charged. The device 40 to be charged transmits the reply instruction of the instruction 3 to the power supply device 10 to indicate the maximum charging current currently supported by the device 40 to be charged, and stage 4 is entered.

At stage 4, the power supply device 10 determines the charging current output by the power supply device 10 for charging the device 40 to be charged in the third charging mode according to the maximum charging current currently supported by the device 40 to be charged, and stage 5 is entered, i.e., a constant-current charging stage is entered.

At stage 5, after entering the constant-current charging stage, the power supply device 10 may transmit an instruction 4 (corresponding to the fourth instruction described above) to the device 40 to be charged at intervals, inquiring the current voltage of the battery of the device 40 to be charged. The device 40 to be charged may transmit the reply instruction of the instruction 4 to the power supply device 10 to feed back the current voltage of the battery. The power supply device 10 may determine whether the charging interface is in the poor contact or not and whether the output current of the power supply device 10 needs to be reduced or not, based on the current voltage of the battery. When the power supply device 10 determines that the charging interface is in the poor contact, an instruction 5 (corresponding to the fifth instruction described above) may be transmitted to the device 40 to be charged, and the power supply device 10 exits the third charging mode, and it resets and reenters stage 1.

Optionally, in some embodiments, at stage 1, when the device 40 to be charged transmits the reply instruction of the instruction 1, the reply instruction of the instruction 1 may carry data (or information) of a path impedance of the device 40 to be charged. The data of the path impedance of the device 40 to be charged may be configured to determine whether the charging interface is in the poor contact or not at stage 5.

Optionally, in some embodiments, at stage 2, the period from when the device 40 to be charged agrees that the power supply device 10 charges the device 40 to be charged in the third charging mode to when the power supply device 10 adjusts the output voltage of the power supply device 10 to a suitable charging voltage, may be controlled within a certain range. If the period exceeds the predetermined range, the power supply device 10 or the device 40 to be charged may determine that the communication process is abnormal, and reset to reenter stage 1.

Optionally, in some embodiments, at stage 2, when the output voltage of the power supply device 10 is higher than the current voltage of the battery of the device 40 to be charged by ΔV (ΔV may be set to 200-500 mV), the device 40 to be charged may transmit the reply instruction of the instruction 2 to the power supply device 10 to indicate that the output voltage of the power supply device 10 matches the voltage of the battery of the device 40 to be charged.

Optionally, in some embodiments, at stage 4, an adjusting speed of the output current of the power supply device 10 may be controlled within the certain range, so as to avoid an abnormality during the charging process due to an excessively-fast adjusting speed.

Optionally, in some embodiments, a range of variation of the output current of the power supply device 10 at stage 5 may be controlled within 5%.

Optionally, in some embodiments, at stage 5, the power supply device 10 may monitor the impedance of the charging channel in real time. In detail, the power supply device 10 may monitor the impedance of the charging channel according to the output voltage and the output current of the power supply device 10 and the current voltage of the battery fed back by the device 40 to be charged. When "the impedance of the charging channel">"the path impedance of the device 40 to be charged+the impedance of a charging cable", it may be considered that the charging interface is in the poor contact, and the power supply device 10 stops charging the device 40 to be charged in the third charging mode.

Optionally, in some embodiments, after the power supply device 10 starts to charge the device 40 to be charged in the third charging mode, a communication interval between the power supply device 10 and the device 40 to be charged, may be controlled within the certain range, so as to avoid an abnormality in the communication process because the communication interval is too short.

Optionally, in some embodiments, a stop of the charging process (or the stop of the charging process of the power supply device 10 to the device 40 to be charged in the third charging mode) may be a recoverable stop or an unrecoverable stop.

For example, when it is detected that the battery of the device 40 to be charged is fully charged or the charging interface is in the poor contact, the charging process is stopped, the charging communication process is reset, and the charging process reenters stage 1. Then, the device 40 to be charged does not agree that the power supply device 10 charges the device 40 to be charged in the third charging mode, and the communication flow does not enter stage 2. The stop of the charging process in this case may be regarded as the unrecoverable stop.

For another example, when the communication abnormality occurs between the power supply device 10 and the device 40 to be charged, the charging process is stopped, the charging communication process is reset, and the charging process reenters stage 1. After the requirement of stage 1 is satisfied, the device 40 to be charged agrees to charge the device 40 to be charged in the third charging mode by the power supply device 10 to resume the charging process. The stop of the charging process in this case may be regarded as the recoverable stop.

For another example, when the device 40 to be charged detects the abnormality in the battery, the charging process is stopped and reset, and stage 1 is reentered. Then, the device 40 to be charged does not agree that the power supply device 10 charges the device 40 to be charged in the third charging mode. When the battery is recovered to be normal and the requirement of stage 1 is satisfied, the device 40 to be charged agrees that the power supply device 10 charges the device 40 to be charged in the third charging mode. The stop of a fast charging process in this case may be considered the recoverable stop.

The communication acts or operations illustrated in FIG. 19 are examples. For example, at stage 1, after the device 40 to be charged is coupled to the power supply device 10, a handshake communication between the device 40 to be charged and the power supply device 10 may also be initiated by the device 40 to be charged. That is, the device 40 to be charged transmits the instruction 1 asking whether the power supply device 10 turns on the third charging mode. When the device 40 to be charged receives the reply instruction for indicating that the power supply device 10 agrees that the power supply device 10 charges the device 40 to be charged in the third charging mode, from the power supply device 10, the power supply device 10 starts charging the battery of the device 40 to be charged in the third charging mode.

As another example, after stage 5, there may be the constant-voltage charging stage. In detail, at stage 5, the device 40 to be charged may feed back the current voltage of the battery to the power supply device 10. When the current voltage of the battery reaches the constant-voltage charging voltage threshold, the charging stage shifts from the constant-current charging stage to the constant-voltage charging stage. During the constant-voltage charging stage, the charging current is gradually reduced. When the current reduces to the certain threshold, it indicates that the battery of the device 40 to be charged is fully charged, the entire charging process is stopped.

The third charging mode is described as an example above. In the second charging mode, the communication flow between the power supply device 10 and the device 40 to be charged also refers to the five stages described above.

The apparatus of the embodiments of the present disclosure is described in detail above with reference to FIG. 1 to 19. The method of the embodiments of the present disclosure is described in detail below with reference to FIG. 20. It should be understood that a description of the method and the description of the apparatus may correspond to each other, and the repeated description is appropriately omitted for the sake of brevity.

FIG. 20 is a schematic flow chart of a charging control method according to an embodiment of the present disclosure. The charging control method of FIG. 20 is applicable to the charging control apparatus. The charging control apparatus may be, for example, the charging control apparatus 20 described above. The charging control apparatus may include the first charging channel, the second charging channel, and the equalizing circuit. The first charging channel is configured to charge the plurality of cells coupled in series according to the charging signal provided by the first-type power supply device. The second charging channel is configured to charge the part of the plurality of cells according to the charging signal provided by the second-type power supply device. The equalizing circuit is configured to equalize the voltages of the plurality of cells during the operating process of the second charging channel.

The charging control method includes an act at block 2010. At block 2010, the second charging channel is controlled to operate and the equalizing circuit is controlled to operate when it is detected that the second-type power supply device is coupled to the charging control apparatus.

Optionally, the charging control method further includes the following. The first charging channel is controlled to operate and the equalizing circuit is controlled to stop operating when it is detected that the first-type power supply device is coupled to the charging control apparatus.

Optionally, the charging control method further includes: communicating with the power supply device, so that the charging signal provided by the power supply device is matched with a current charging stage of the cells.

Optionally, the equalizing circuit is the Cuk circuit or the equalizing circuit based on the Buck-Boost.

Optionally, the plurality of cells are two cells, and the part of the plurality of cells is one of the two cells.

Those ordinary skilled in the art will appreciate that various illustrative elements and algorithm steps described in connection with the embodiments of the present disclosure may be implemented as an electronic hardware, or a combination of a computer software and the electronic hardware. Whether such functions are implemented as a hardware or a software depends upon a particular application and a design constraint imposed on the technical solution. Those skilled in the art may implement the described functions in varying ways for each particular application, but such implementation decisions should not be interpreted as causing a departure from the scope of the present disclosure.

It may be understood by those skilled in the art that, for a convenience and a simplicity of the description, the operating processes of the system, apparatus and unit described above may refer to the corresponding processes in the foregoing embodiments of the method, which will not be elaborated here.

In several embodiments according to the present disclosure, it should be understood that the disclosed system, apparatus and method may be implemented in other ways. For example, the embodiments of the apparatus described above are illustrative, and for example, the division of the units is only one type of a logical functional division, and other divisions may be realized in practice, for example, a plurality of units or components may be combined or integrated into another system, or some features may be omitted, or not executed. In addition, the shown or discussed mutual coupling or direct coupling or communication connection may be an indirect coupling or a communication connection through some interfaces, apparatuses or units, and may be in an electrical, mechanical or other form.

The units described as a separate part may or may not be physically separate, and parts displayed as units may or may not be physical units, may be located in one position, or may be distributed on a plurality of network units. Some or all of the units may be selected according to actual needs to achieve the purpose of the solution of the embodiment.

In addition, functional units of the embodiments of the present disclosure may be integrated into one processing unit, or each unit may exist alone physically, or two or more units are integrated into one unit.

The functions may be stored in a computer-readable storage medium if they are implemented in the form of software functional units and sold or used as individual products. Based on such understanding, the technical solution of the present disclosure or portions thereof that substantially contribute to the prior art may be embodied in the form of a software product, which is stored in a storage medium and includes several instructions for causing a computer device (which may be a personal computer, a server, or a network device) to execute all or part of the steps of the methods described in the embodiments of the present disclosure. And the aforementioned storage medium includes: a U-disk, a removable hard disk, a Read-Only Memory (ROM), a Random Access Memory (RAM), a magnetic disk, or an optical disk, and various media capable of storing program codes.

What is claimed is:

1. A charging control apparatus, comprising:
    a first charging channel, configured to charge a plurality of cells coupled in series according to a charging signal provided by a first-type power supply device;
    a second charging channel, configured to charge a part of the plurality of cells according to a charging signal provided by a second-type power supply device;
    an equalizing circuit, configured to equalize voltages of the plurality of cells; and
    a control circuit, configured to turn on the second charging channel and the equalizing circuit when it is detected that the second-type power supply device is coupled to the charging control apparatus.

2. The charging control apparatus of claim 1, wherein,
    the control circuit is further configured to determine a magnitude of an equalizing current in the equalizing circuit according to a magnitude of a charging current provided by the second-type power supply device, so as to ensure that a current flowing into the part of the plurality of cells is equal to a current flowing into a remaining of the plurality of cells.

3. The charging control apparatus of claim 2, wherein,
    the charging control apparatus is further configured to acquire at least one of current electric quantities or current voltages of the plurality of cells; and
    the control circuit is further configured to adjust the magnitude of the equalizing current in the equalizing circuit according to one or more difference values among the at least one of the current electric quantities or the current voltages of the plurality of cells.

4. The charging control apparatus of claim 1, wherein the control circuit is further configured to turn on the first charging channel and turn off the equalizing circuit when it is detected that the first-type power supply device is coupled to the charging control apparatus.

5. The charging control apparatus of claim 1, further comprising:
    a communication circuit, configured to communicate with the power supply device, so that the charging signal provided by the first-type power supply device or the second-type power supply device is matched with a current charging stage of the cells.

6. The charging control apparatus of claim 1, wherein the equalizing circuit is a Cuk circuit, the charging control apparatus further comprises a control circuit,
    configured to, during an operating process of the second charging channel, transmit a driving signal to the Cuk circuit to drive the Cuk circuit, so that the plurality of cells transfer energy through the Cuk circuit, so as to equalize the voltages of the plurality of cells.

7. The charging control apparatus of claim 6, wherein the charging control apparatus is further configured to acquire at least one of current electric quantities or current voltages of the plurality of cells; and
    the control circuit is configured to:
    when one or more difference values among the at least one of the current electric quantities or the current voltages of the plurality of cells are greater than a preset threshold, transmit the driving signal to the Cuk circuit to drive the Cuk circuit.

8. The charging control apparatus of claim 7, wherein the control circuit is further configured to adjust a duty ratio of the driving signal to adjust a magnitude of a current in the Cuk circuit.

9. The charging control apparatus of claim 8, further comprising:
a current detection circuit, configured to detect the current in the Cuk circuit; and
the control circuit being configured to adjust the duty ratio of the driving signal to adjust the magnitude of the current in the Cuk circuit, by acts:
determining, by the control circuit, a target value of the current in the Cuk circuit according to the one or more difference values among the at least one of the current electric quantities or the current voltages of the plurality of cells; and
adjusting, by the control circuit, the duty ratio of the driving signal so that the current of the Cuk circuit, detected by the current detection circuit, reaches the target value.

10. The charging control apparatus of claim 1, wherein the equalizing circuit is an equalizing circuit based on an RLC series circuit or an equalizing circuit based on Buck-Boost.

11. The charging control apparatus of claim 1, wherein the plurality of cells comprises two cells, and the part of the plurality of cells comprises one of the two cells.

12. A device to be charged, comprising:
a battery, comprising a plurality of cells coupled with each other in series; and
a charging control apparatus, comprising:
a first charging channel, configured to charge a plurality of cells coupled in series according to a charging signal provided by a first-type power supply device:
second charging channel, configured to charge a part of the plurality of cells according to a charging signal provided by a second-type power supply device:
an equalizing circuit, configured to equalize voltages of the plurality of cells; and
a control circuit, configured to turn on the second charging channel and the equalizing circuit when it is detected that the second-type power supply device is coupled to the charging control apparatus.

13. A method of charging control for a charging control apparatus,
the charging control apparatus comprising: a first charging channel, configured to charge a plurality of cells coupled in series according to a charging signal provided by a first-type power supply device; a second charging channel, configured to charge a part of the plurality of cells according to a charging signal provided by a second-type power supply device; an equalizing circuit, configured to equalize voltages of the plurality of cells; and a control circuit, configured to turn on the second charging channel and the equalizing circuit when it is detected that the second-type power supply device is coupled to the charging control apparatus,
the method comprising:
turning on the second charging channel and the equalizing circuit when it is detected that the second-type power supply device is coupled to the charging control apparatus.

14. The method of claim 13, comprising:
determining a magnitude of an equalizing current in the equalizing circuit according to a magnitude of a charging current provided by the second-type power supply device, so as to ensure that a current flowing into the part of the plurality of cells is equal to a current flowing into a remaining of the plurality of cells.

15. The method of claim 14, comprising:
acquiring at least one of current electric quantities or current voltages of the plurality of cells; and
adjusting the magnitude of the equalizing current in the equalizing circuit according to one or more difference values among the at least one of the current electric quantities or the current voltages of the plurality of cells.

16. The method of claim 13, further comprising:
turning on the first charging channel and turning off the equalizing circuit when it is detected that the first-type power supply device is coupled to the charging control apparatus.

17. The method of claim 13, further comprising:
communicating with the power supply device, so that the charging signal provided by the power supply device is matched with a current charging stage of the cells.

18. The method of claim 13, wherein the equalizing circuit is a Cuk circuit, and the method comprises:
transmitting a driving signal to the Cuk circuit to drive the Cuk circuit, so that the plurality of cells transfer energy through the Cuk circuit, so as to equalize the voltages of the plurality of cells.

19. The method of claim 18, further comprising:
adjusting a duty ratio of the driving signal to adjust a magnitude of a current in the Cuk circuit.

* * * * *